United States Patent
Shimozono et al.

(10) Patent No.: US 7,380,004 B2
(45) Date of Patent: May 27, 2008

(54) STORAGE SYSTEM, COMPUTER SYSTEM, AND METHOD OF CONFIGURING STORAGE SYSTEM

(75) Inventors: Norio Shimozono, Machida (JP); Kazuhisa Fujimoto, Kokubunji (JP); Kiyoshi Honda, Yokohama (JP); Naoko Iwami, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 569 days.

(21) Appl. No.: 10/884,976

(22) Filed: Jul. 7, 2004

(65) Prior Publication Data

US 2006/0031389 A1 Feb. 9, 2006

(30) Foreign Application Priority Data

May 6, 2004 (JP) ............................ 2004-137253

(51) Int. Cl.
*G06F 15/173* (2006.01)
*G06F 13/00* (2006.01)
*G06F 11/00* (2006.01)

(52) U.S. Cl. .................. 709/226; 710/316; 709/224; 709/225; 370/217

(58) Field of Classification Search ............... None
See application file for complete search history.

(56) References Cited

U.S. PATENT DOCUMENTS 6,385,681 B1 5/2002 Fujimoto et al.
6,542,961 B1 4/2003 Matsunami et al.
6,662,253 B1 12/2003 Gary et al.
6,820,171 B1* 11/2004 Weber et al. ............... 711/114
6,910,102 B2 6/2005 Matsunami et al.
6,915,367 B2 7/2005 Gary et al.
7,082,100 B2* 7/2006 Linnell et al. ............. 370/217
2002/0152305 A1* 10/2002 Jackson et al. ............ 709/224

* cited by examiner

*Primary Examiner*—Wen-Tai Lin
(74) *Attorney, Agent, or Firm*—Mattingly, Stanger, Malur & Brundidge, P.C.

(57) ABSTRACT

A storage system is provided with a plurality of interface units each for connection with a server; an interface unit for connection with hard disk drives; a plurality of microprocessor units each for processing commands; and a switch unit for interconnecting the interface units and microprocessor units. A management console is also connected to the storage system. The storage system forces the management console to select an unused interface unit from among the plurality of interface units for use in a data input/output process between the server and the storage system, select a microprocessor unit which meets required performance of the server from among the plurality of microprocessor units for use in the data input/output process, and notify the administrator of the selected interface unit and microprocessor unit.

11 Claims, 24 Drawing Sheets

FIG. 7A

PORT CONFIGURATION INFORMATION 612

| EXTERNAL INTERFACE NUMBER | OCCUPATION FLAG | REQUIRED PERFORMANCE | MICROPROCESSOR NUMBER |
|---|---|---|---|
| • | • | • | • |
| • | • | • | • |
| • | • | • | • |
| • | • | • | • |

VOLUME CONFIGURATION INFORMATION 613

| NUMBER FOR HARD DISK DRIVES | OCCUPATION FLAG | MICROPROCESSOR NUMBER | NUMBER FOR INTERFACE UNIT | EXTERNAL INTERFACE NUMBER | LUN |
|---|---|---|---|---|---|
| • | • | • | • | • | • |
| • | • | • | • | • | • |
| • | • | • | • | • | • |

PROCESSOR CONFIGURATION INFORMATION 614

| MICROPROCESSOR NUMBER | NUMBER OF ASSIGNED EXTERNAL INTERFACES |
|---|---|
| • | • |
| • | • |
| • | • |
| • | • |

PA CONFIGURATION INFORMATION 615

| PA NUMBER (615a/6151) | EXTERNAL INTERFACE NUMBER (615b/6152) | LUN (615c/6153) | OCCUPATION FLAG (615d/6154) | REQUIRED PERFORMANCE (615e/6155) | NUMBER FOR ASSIGNED SA (615f/6156) | NUMBER FOR COMMAND PROCESSING QUEUE (615g/6157) |
|---|---|---|---|---|---|---|
| ⋮ | ⋮ | ⋮ | ⋮ | ⋮ | | ⋮ |

FIG. 21B

VOLUME CONFIGURATION INFORMATION 616

| SA NUMBER (616a/6161) | NUMBER FOR HARD DISK DRIVES (616b/6162) | OCCUPATION FLAG (616c/6163) | NUMBER FOR COMMAND PROCESSING QUEUE (616d/6164) |
|---|---|---|---|
| ⋮ | ⋮ | ⋮ | ⋮ |

FIG. 21C

SA CONFIGURATION INFORMATION 617

| SA NUMBER (617a/6171) | NUMBER OF ASSIGNED VOLUMES (617b/6172) |
|---|---|
| ⋮ | ⋮ |

STORAGE SYSTEM, COMPUTER SYSTEM, AND METHOD OF CONFIGURING STORAGE SYSTEM

INCORPORATION BY REFERENCE

The present application claims priority from Japanese application JP2004-137253 filed on May 6, 2004, the content of which is hereby incorporated by reference into this application.

BACKGROUND OF THE INVENTION

The present invention relates to a computer system, a storage system, and techniques for facilitating the configuration of the storage system on a management console.

With the advance of information technologies, proliferation of the Internet, and the like, the amount of data handled by computer systems operated in enterprises continues to increase. Therefore, a storage system for preserving a large capacity of data is an essential material for a computer system. There are a variety of storage systems which provide a small scale to a large scale of configurations.

As a storage system becomes more important in a computer system, the storage system presents a challenge in a reduction of cost, including the operation and administration. For this reason, there is a need for a storage system which can be increased in scale in accordance with the scale of an associated computer system with reasonable investments, i.e., a storage system which meets both cost performance and performance scalability.

U.S. Pat. No. 6,385,681 B1 discloses one type of storage system. The storage system provided by U.S. Pat. No. 6,385,681 B1 comprises a plurality of channel interface units for executing data transfers between computers (hereinafter also called the "server"); a plurality of disk interface units for executing data transfers between hard disk drives; a cache memory unit for temporarily storing data which is to be stored in hard disk drives; and a control memory unit for storing control information. In the storage system of U.S. Pat. No. 6,385,681 B1, the channel interface units, disk interface units, and cache memory unit are connected to one another through an interconnection, and the channel interface units, disk interface units, and control memory unit are also connected to one another through the interconnection. The interconnection comprises a common bus, switches, and the like. A variety of configurations in different scales can be accomplished by changing the number of the channel interface units and disk interface units.

U.S. Pat. No. 6,542,961 B1 discloses a storage system, wherein a plurality of disk arrays are connected to a plurality of servers through disk array switches, and the plurality of disk arrays are managed as a single storage system by a system configuration management unit connected to the disk array switch and to each disk array.

Generally, required performance (the number of times of data input/output operations per unit time, and the amount of data transferred per unit time) for a server connected to a storage system is not always the same. In addition, the required performance such as the number of times of input/output operations per unit time largely depends on the performance of a particular processor employed in a storage system for assignment to a data input/output process. If the required performance for a server is not consistent with the performance of a processor assigned to handle input/output commands received from the server, the following problems can arise. Specifically, when a processor has processing performance higher than predetermined required performance called for by a server which is connected to a port associated with the processor, the processor provides excessive processing performance. On the other hand, when a processor has processing performance lower than predetermined required performance called for by a server which is connected to a port associated with the processor, the processor may fail to provide sufficient processing performance.

The storage system disclosed in U.S. Pat. No. 6,385,681 B1 can take a configuration suitable for the number of servers and hard disk drives which can be connected in the system by increasing or decreasing channel interface units and disk interface units as required. However, in the storage system disclosed in U.S. Pat. No. 6,385,681 B1, each channel interface unit has a processor, and a port connected to a server is in a fixed correspondence relationship with a processor which processes commands from the port. With this fixed correspondence, in the storage system of U.S. Pat. No. 6,385,681 B1, excessive processing performance can be provided by a processor associated with a port which is connected to a server that calls for low required performance, or insufficient processing performance can be provided by a processor associated with a port which is connected to a server that calls for high required performance.

The storage system disclosed in U.S. Pat. No. 6,542,961 B1 in turn can change the number of host interfaces connected to servers and disk array subsets by connecting the disk array switches in multiple stages. However, U.S. Pat. No. 6,542,961 B1 does not particularly take into consideration how processors can be configured to effectively utilize resources provided by the system in accordance with required performance of the respective servers. Therefore, for determining the configuration of the storage system in U.S. Pat. No. 6,542,961 B1, an administrator must be aware of the performance, use situation, and the like of each disk array subset, thus forcing the administrator to be in charge of difficult configuration operations.

SUMMARY OF THE INVENTION

In view of the problems experienced in the conventional storage systems, it is an object of the present invention to provide a computer system which is capable of flexibly supporting user's requests to efficiently utilize resources of the computer system through simple configuration operations. Specifically, it is an object of the present invention to provide a storage system which is capable of allowing the user to set, through simple operations, an optimal correspondence relationship between interfaces (ports) connected to servers and hard disk drives accessed by processors and servers which process commands received through the interfaces associated therewith.

It is another object of the present invention to provide a computer system which proposes an administrator an appropriate correspondence of interfaces (ports) connected to servers to processors and hard disk drives.

To achieve the above object, one aspect of the present invention is applied to a storage system which is connected to a computer through a network for receiving a variety of commands from the computer to perform a data input/output process between the storage system and the computer.

The storage system includes a plurality of first interfaces each for receiving a variety of commands from a computer, a storage device for storing data, a second interface for communicating data to/from the storage device, a plurality of processors for performing a data input/output process corresponding to a received command, a management unit responsive to a request from an administrator for establishing a variety of configurations for the storage system, and an interconnection for connecting the first interfaces, second interface, processors, and management unit to one another. The management unit selects an unused first interface from among the plurality of first interfaces for use in the data input/output process between the computer and the storage device, selects a processor which meets required performance of the computer from among the plurality of processors for use in the data input/output process, and configures the storage system with the selected first interface and processor.

As described above, according to the present invention, the first interfaces each for receiving a variety of commands from a computer, processors for processing commands received by the associated first interfaces, second interface for communicating data to/from the storage device, and management unit are connected to one another through the interconnection. Then, the management unit selects an unused first interface from among the plurality of first interfaces for use in the data input/output process between the computer and the storage device, selects a processor which meets required performance of the computer from among the plurality of processors for use in the data input/output process, and sets the selected first interface and processor.

In particular, the storage system of the present invention can flexibly change an interface (port) for receiving commands from a computer, and a processor assigned to a data input/output process for the interface. Also, according to the present invention, the storage system can be configured in accordance with required performance with a computer connected thereto. It is therefore possible, according to the present invention, to efficiently utilize resources provided by the storage system.

Other objects, features and advantages of the invention will become apparent from the following description of the embodiments of the invention taken in conjunction with the accompanying drawings.

BRIEF DESCRIPTION OF THE DRAWINGS

FIGS. 7A, 7B, 7C are tables schematically showing data structures of port configuration information, volume configuration information, and processor configuration information held in the storage system in the first embodiment of the present invention;

FIGS. 21A, 21B, 21C are tables schematically showing PA configuration information, volume configuration information, and SA configuration information held in the storage system in the third embodiment of the present invention;

DETAILED DESCRIPTION OF THE EMBODIMENTS

In the following, the present invention will be described in connection with several embodiments thereof.

First Embodiment

To begin with, a first embodiment of the present invention will be described.

Figure 1:
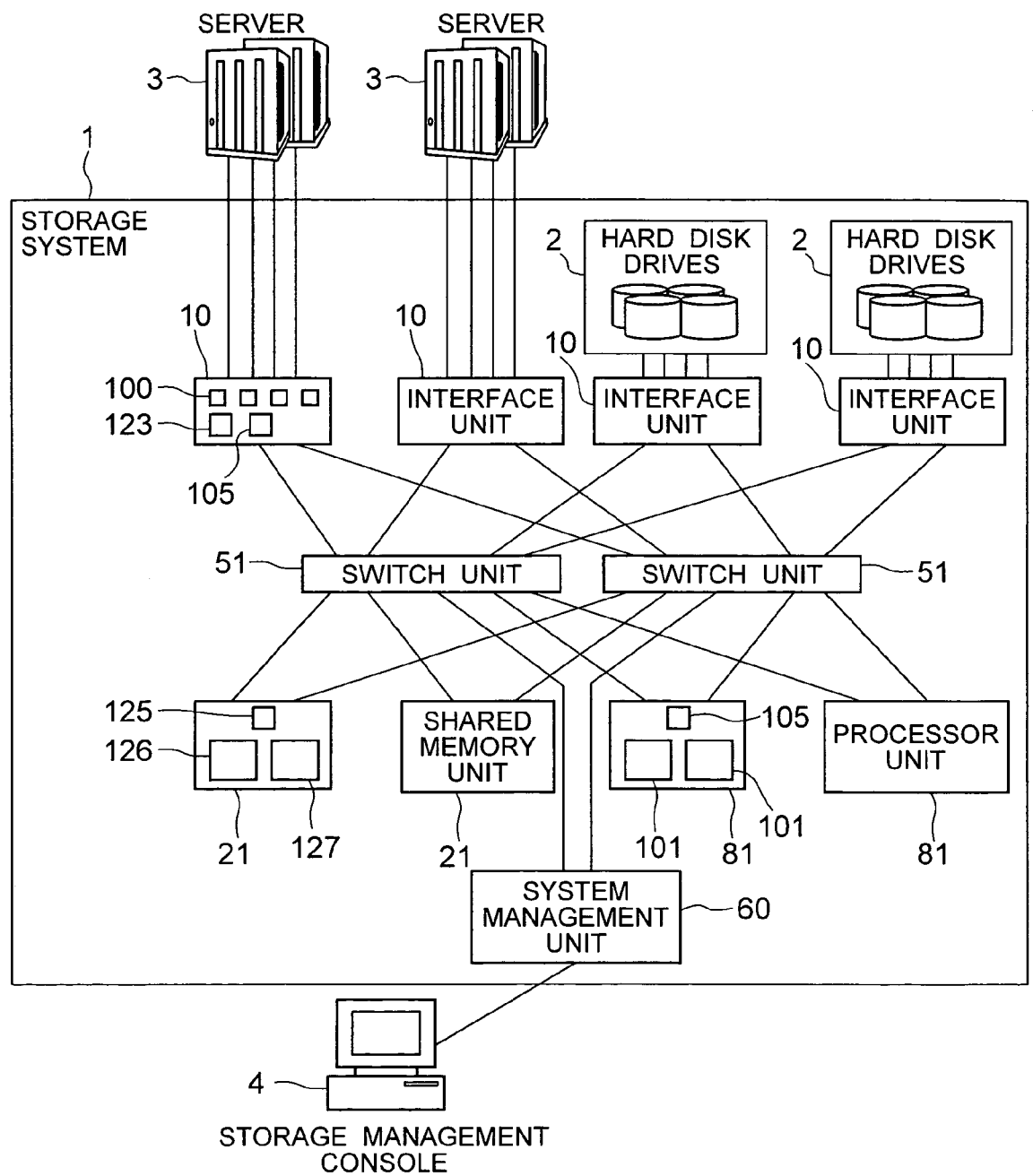
FIG. 1 is a block diagram illustrating the configuration of a computer system according to a first embodiment of the present invention.

FIG. 1 is a block diagram illustrating the configuration of a computer system according to the first embodiment of the present invention.

As illustrated, the computer system comprises a storage system 1; at least one server computer (hereinafter simply called the "server") 3; and a storage management console 4. The storage system 1 and server 3 are interconnected, for example, through an interface called "Fibre Channel," and communicate commands and data with each other using a protocol called "FCP" (Fibre Channel Protocol). The storage system 1 and storage management console 4 are interconnected through a LAN (Local Area Network).

In this embodiment, no particular limitations are imposed on the type of interface and protocol which are used between the storage system 1 and server 3. For example, a different combination of interface and protocol, such as Ethernet (registered trademark) and iSCSI, may be used instead of that mentioned above. Also, while the storage system 1 and storage management console 4 are interconnected through LAN in the foregoing description, this is merely illustrative.

The server 3 is a computer which inputs and outputs data to/from the storage system 1. The storage system 1 is a system which provides storage areas (hereinafter also called "volumes") to the server 3. As the server 3 transmits a command to the storage system 1, the storage system 1 transfers data to the server 3 or receives data from the server 3 in accordance with the command. The storage system 1 provides at least one volume for each external interface 100, later described.

The server 3 can instruct the storage system 1 to transfer data stored in a volume specified thereby. For example, when FCP is used, the server 3 can issue a number called "LUN" (Logical Unit Number) added to a command to the storage system 1 to specify a particular volume. A command includes a command code indicative of the type of the command, such as read and write, and information such as an address indicative of the position in a volume from which a data transfer should be started, a transfer length, and the like.

The storage System 1 comprises interface units 10; a shared memory unit 21; microprocessor units 81; a system management unit 60, a switch unit 51 for connecting these components; and hard disk drives 2.

The hard disk drives 2 hold data stored in volumes (hereinafter also called "data of volume"). Specifically, a volume is created based on a physical storage area provided by the hard disk drives 2, and data of volume is stored in a storage area in the hard disk drives 2 corresponding to the volume. Certain interface units 10 connect the storage system 1 to the servers 3 for communication of commands and data therebetween. Other interface units 10 are connected to the hard disk drives 2 for communication of commands and data therebetween.

The shared memory unit 21 holds part of data of volume, and control information on the storage system 1. Each of the microprocessor unit 81 interprets commands from the server 3 to control data transfers. The switch unit 51 is connected to the interface units 10, shared memory unit 21, microprocessor units 81, and system management unit 60, respectively, to transfer data between these components. The system management unit 60 is connected to the storage management console 4 for communicating configuration information on the storage system 1, configuration instructions, and the like. The switch unit 51 also serves as an interconnection for transferring control information and data among the interface units 10, shared memory unit 21, microprocessor units 81, and system management unit 60. While the switch unit 51 is used in this embodiment as the interconnection, any other means may be used instead as long as it has equivalent functions. For example, the interconnection may be implemented by a bus.

The storage management console 4 is a computer for establishing a variety of configurations for the storage system 1. In this embodiment, the storage management console 4 determines an appropriate configuration for the storage system 1 from required performance of each server 3, entered by the administrator, and presents (proposes) the determined configuration to the storage administrator. In this way, the use of this embodiment can facilitate the management of the storage system 1.

Next, the interface unit 10 contained in the storage system 1 will be described in terms of its specific configuration with reference to FIG. 2.

Figure 2:
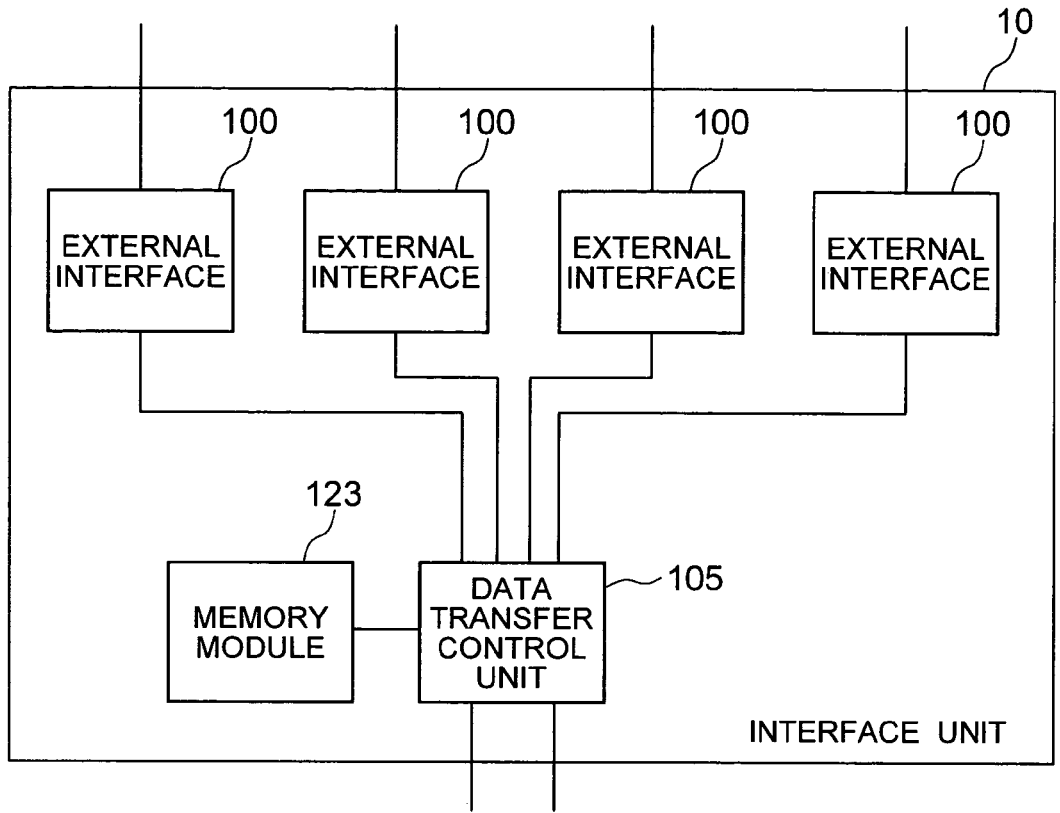
FIG. 2 is a block diagram illustrating the configuration of an interface unit 10 in the computer system according to the first embodiment of the present invention.

FIG. 2 is a block diagram illustrating the configuration of the interface unit 10 in the first embodiment of the present invention.

As illustrated, the interface unit 10 comprises four external interfaces 100; a data transfer control unit 105, and a memory module 123. It should be understood that the quantities are merely illustrative, and this embodiment is not limited to the above-mentioned quantities of the components (external interface 100, data transfer control unit 105, and memory module 123) which form part of the interface unit 10. Likewise, in the entirety of the following description, the quantities of respective components which make up the computer system are not limitations to the present invention.

The memory module 123 stores port configuration information which is utilized by the external interfaces 100 for data transfer (port configuration information will be described later). The data transfer control unit 105 controls data transfers performed among the external interfaces 100, memory module 123, and switch unit 51.

Each of the external interfaces 100 communicates commands and transfers data between the server 3 and the external interface 100 or between the hard disk drives 2 and the external interface 100. The external interface 100 forwards a command received from the server 3 to the associated microprocessor unit 81 based on the port configuration information 612 stored in the memory module 123. Also, the external interface 100 receives instructions from the microprocessor 101 (see FIG. 3) of the associated microprocessor unit 81 to transfer data between the server 3 and the hard disk drives 2 and shared memory 21.

Next, the microprocessor unit 81 of the storage system 1 will be described in terms of its specific configuration with reference to FIG. 3.

Figure 3:
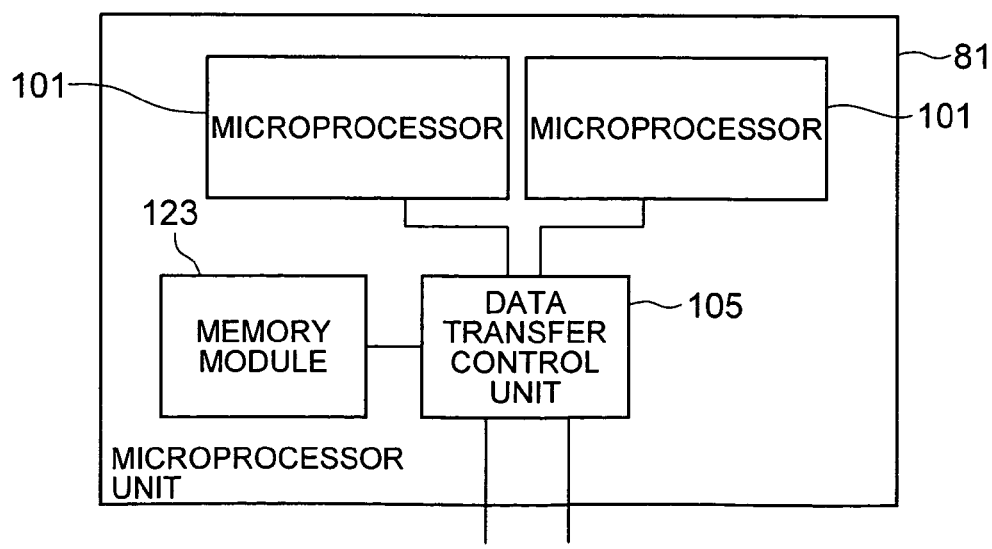
FIG. 3 is a block diagram illustrating the configuration of a microprocessor unit 81 in the computer system according to the first embodiment of the present invention.

FIG. 3 is a block diagram illustrating the configuration of the microprocessor unit 81 in the first embodiment of the present invention. As illustrated, the microprocessor unit 81 comprises a memory module 123; a data transfer control unit 105; and at least one microprocessor 101. The memory module 123 and data transfer control unit 105 are identical in configuration to those illustrated in the aforementioned FIG. 2. The microprocessor 101 performs a process corresponding to a command received by the interface unit 10 from the server 3.

Next, the shared memory unit 21 of the storage unit 1 will be described in terms of its specific configuration with reference to FIG. 4.

Figure 4:
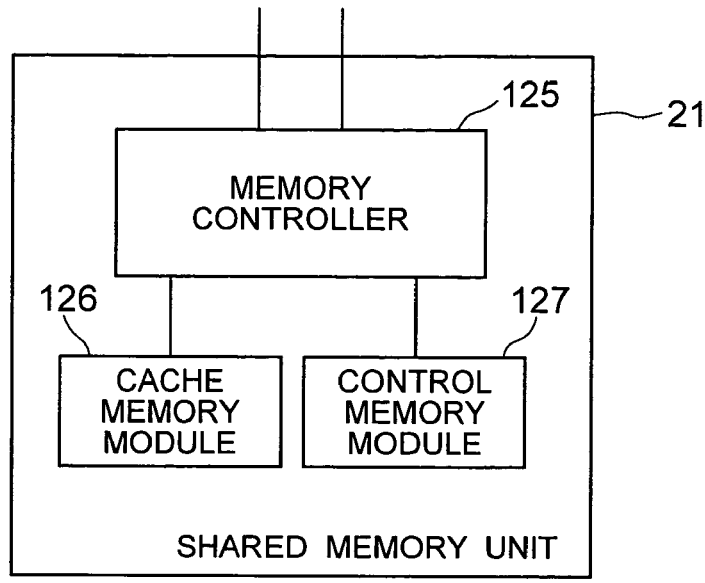
FIG. 4 is a block diagram illustrating the configuration of a shared memory unit 21 in the computer system according to the first embodiment of the present invention.

FIG. 4 is a block diagram illustrating the configuration of the shared memory unit 21 in the first embodiment of the present invention. As illustrated, the shared memory unit 21 comprises a cache memory module 126 for temporarily storing data of a volume; a control memory module 127 for holding control information on the storage system 1; and a memory controller 125 for controlling these components and for transferring data between the switch unit 51 and the cache memory module 126 and control memory module 127.

Next, the system management unit 60 of the storage system 1 will be described in terms of its specific configuration with reference to FIG. 5.

Figure 5:
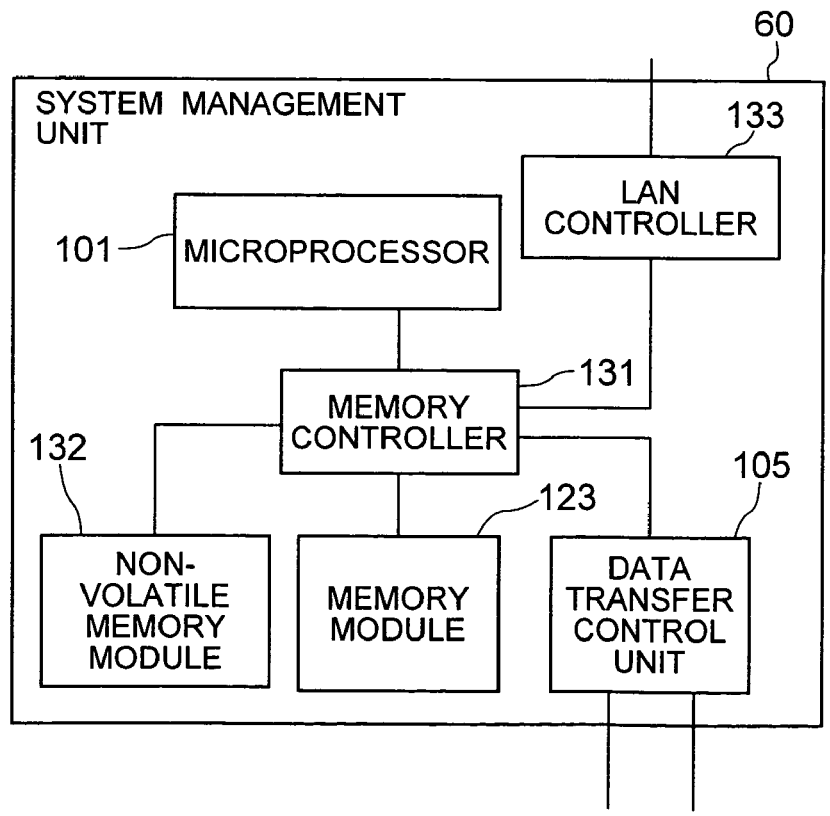
FIG. 5 is a block diagram illustrating the configuration of a system management unit 60 in the computer system according to the first embodiment of the present invention.

FIG. 5 is a block diagram illustrating the configuration of the system management unit 60 in the first embodiment of the present invention. The system management unit 60 comprises a LAN controller 133 for connecting the storage system 1 to the storage management console 4; a data transfer control unit 105; a memory module 123; a microprocessor 101; and a memory controller 131 for controlling a non-volatile memory module 132 for storing a variety of configuration information, later described, and programs, and the memory module 123. The memory controller 131 is connected to the memory module 123, non-volatile memory module 132, LAN controller 133, data transfer control unit 105, and microprocessor 101.

Next, programs executed by the storage system 1 and the structures of respective data in the first embodiment will be described with reference to FIG. 6.

Figure 6:
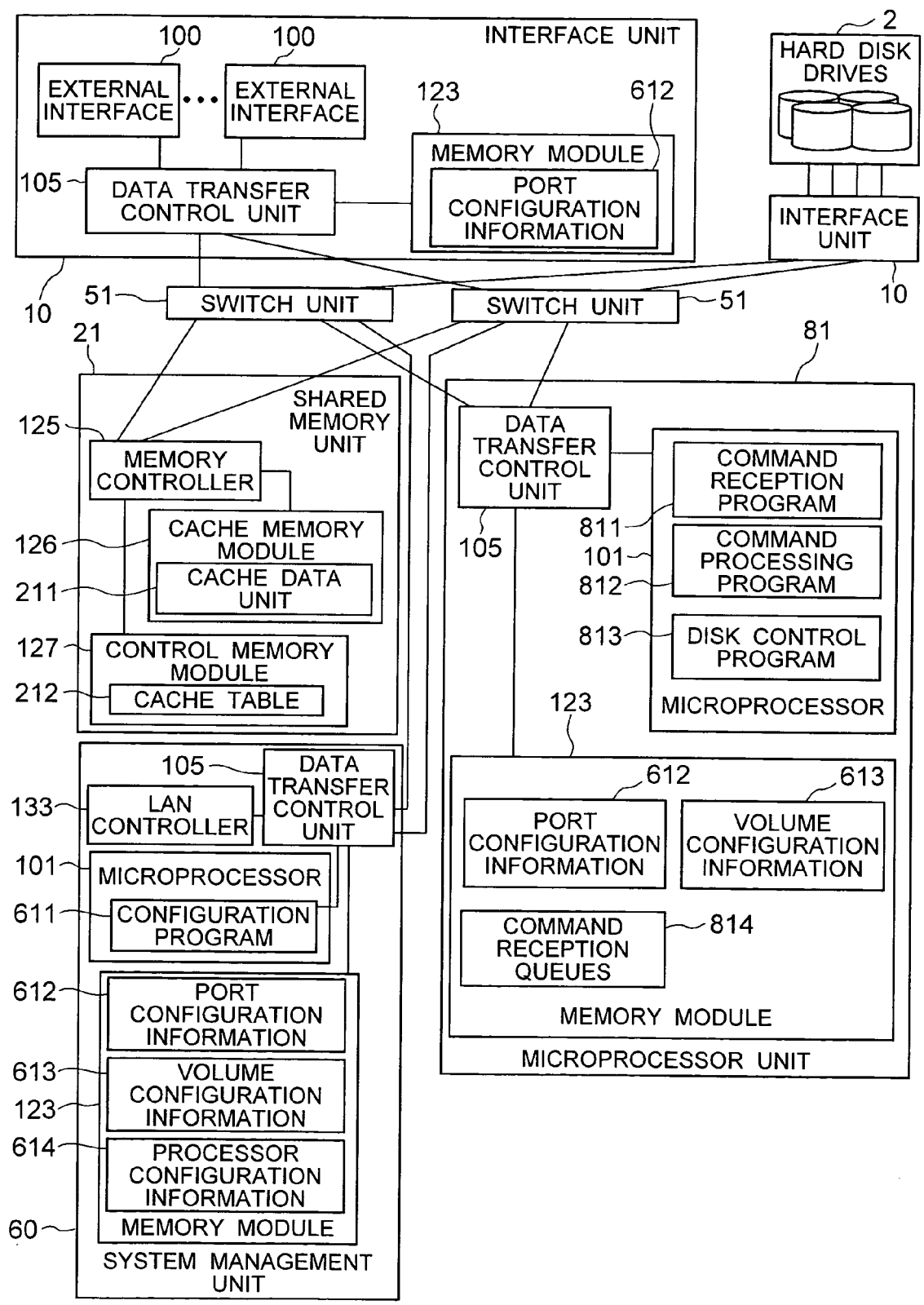
FIG. 6 is a block diagram representing programs executed by a storage system 1, and the structures of various data processed by the storage system 1 in the first embodiment of the present invention.

FIG. 6 is a block diagram representing programs executed by the storage system 1, and the structures of various data handled in the storage system 1 in the first embodiment of the present invention.

First described is data held by the memory module 123 of the interface unit 10. The memory module 123 stores port configuration information 612. The port configuration information 612 indicates the correspondence of each external interface 100 to the microprocessor 101 which processes commands received through this external interface 100.

Next described is data held in the shared memory unit 21. The cache memory module 126 of the shared memory unit 21 comprises a cache data unit 211. The control memory module 127 in turn holds a cache table 212.

The cache data unit 211 is a storage area for temporarily holding data stored in the hard disk drives 2, data which should be stored in the hard disk drives 2, and the like for purposes of improving the performance of the storage system 1. The cache table 212 is a table for holding the correspondence of data stored in the cache data unit 211 to data stored in the hard disk drives 2.

Next described are data held by the microprocessor unit 81 and each program executed by the microprocessor unit 81. The memory module 123 of the microprocessor unit 81 holds volume configuration information 613 and command reception queues 814 in addition to the aforementioned port configuration information 612. The volume configuration information 613 refers to information representative of the correspondence of volumes provided by the storage system 1 to the server 3 to the hard disk drives 2. The command reception queues 814 in turn are queues, each associated with one external interface 100, for orderly arranging commands received by the microprocessor 101 from the associated external interface 100 and temporarily storing the orderly arranged commands.

The microprocessor 101 also executes a command reception program 811, a command processing program 812, and a disk control program 813, respectively, to perform a variety of processes. The command reception program 811 is run in response to a notified reception of a command from one of the external interfaces 100 of the interface unit 10 to register the received command in the appropriate command reception queue 814. The command processing program 812 executes a variety of commands (for example, a data read command) from the server 3. The disk control program 813 is called from the command processing program 812 to execute a data transfer between the hard disk drives 2 and the cache memory module 126. These programs will be described later in greater detail.

Next described are data held by the system management unit 60 and each program executed by the system management unit 60. The memory module 123 of the system management unit 60 stores the port configuration information 612, volume configuration information 613, and processor configuration information 614. The processor configuration information 614 is data indicative of how the microprocessors 101 are occupied in each microprocessor unit 81. The microprocessor 101 of the system management unit 60 executes a configuration program 611. The configuration program 611 communicates with the storage management console 4 through the LAN controller 133 to transfer the port configuration information 612, volume configuration information 613, and processor configuration information 614 to the storage management console 4 or to set the information 612, 613, 614.

Though not shown in the figure, during initialization caused by power-on of the storage system 1 or the like, the microprocessor 101 of the system management unit 60 loads an initialize program from the non-volatile memory module 132 for execution. In the initialize program, the microprocessor 101 loads each of the aforementioned programs (command reception program 811, command processing program 812, and disk control program 813) from the non-volatile memory module 132, as well as data, and copies the programs and data into the memory modules 123 of the interface unit 10 and microprocessor unit 81. The initialize program causes each microprocessor 101 of the microprocessor unit 81 to start the command processing program 812 to initialize the cache data unit 211 and cache table 212 in the shared memory unit 21.

Next, the data structures of the port configuration information 612, volume configuration information 613, and processor configuration information 614, held in the storage system 1 of this embodiment, will be described with reference to FIGS. 7A, 7B, 7C.

FIGS. 7A, 7B, 7C are tables schematically showing the data structures of the port configuration information 612, volume configuration information 613, and processor configuration information 614 held in the storage system 1 of this embodiment, respectively.

First described is the port configuration information 612 shown in FIG. 7A. The port configuration information 612, which is provided for holding data of the external interfaces 100, has a plurality of entries 612a-612d. The entry 612a stores an "external interface number 6121" which specifies (identifies) an external interface 100 in the storage system 1. The entry 612b stores an "occupation flag 6122" indicative of whether or not the external interface 100 identified by the "external interface number 6121" stored in the entry 612a is connected to the server 3 and is now in use.

The entry 612c stores "required performance 6123" which is data indicative of required performance for the server 3 connected to the external interface 100 having the "external interface number 6121" stored in the entry 612a. In this embodiment, the "required performance 6123" is represented by data which indicates the number of commands that can be executed per unit time, but the "required performance 6123" is not particularly limited to this data.

The entry 612d stores a "microprocessor number 6124" indicative of a microprocessor 101 which is assigned to process commands received by the external interface 100 identified by the "external interface number 6121" stored in the entry 612a. The "microprocessor number" refers to a number for specifying (number for identifying) a microprocessor 101 in the storage system 1.

Next described is the volume configuration information 613 shown in FIG. 7B. The volume configuration information 613, which is provided for holding settings for each of the hard disk drives 2, has a plurality of entries 613a-613f. The entry 613a stores a "number for hard disk drives 6131" for specifying (identifying) each of the hard disk drives 2 in the storage system 1. The entry 613b stores an "occupation flag 61312" indicative of whether or not the hard disk drives 2 identified by the "number for hard disk drives 6131" stored in the entry 613a are in use.

The entry 613c stores a "microprocessor number 6133" which specifies a microprocessor 101 that accesses the external interface 100 connected to the hard disk drives 2 identified by the "number for hard disk drives 6131" stored in the entry 613a. The entry 613d stores an "interface number 6134" indicative of the interface unit 10 connected to the hard disk drives 2 identified by the "number for hard disk drives 6131" stored in the entry 613a.

The entries 613e, 613f store an "external interface number 6135" and a "LUN (Logical Unit Number) 6136," respectively. The "external interface number 6135" and "LUN (Logical Unit Number) 6136" are data for specifying a volume which is desired for an access from the server 3. Specifically, the server 3 can access data stored in intended hard disk drives 2 by issuing a command with the "LUN (logical Unit Number" 6136" added to the "external interface number 6135" for specifying the external interface 100 to which the server 3 itself is connected.

While this embodiment handles the hard disk drives 2 and volumes in a one-to-one corresponding relationship, a plurality of volumes can be defined for a single hard disk drive 2 in consideration of the capacity of the hard disk drives 2.

Next described is the processor configuration information 614 shown in FIG. 7C. The processor configuration information 614 has a plurality of entries 614a-614b. The entry 614a stores a "microprocessor number 6141" for specifying (identifying) a microprocessor 101 in the storage system 1. The entry 614b stores a "number of assigned external interface 6142" indicative of the number of the external interface units 100 connected to the server 3 which is assigned to the microprocessor 101 identified by the "microprocessor number 6141" stored in the entry 614a.

Next, the operation of each program executed in the storage system 1 according to this embodiment will be described with reference to FIGS. 8 and 9.

Described first is each program executed by the microprocessor unit 81.

Figure 8:
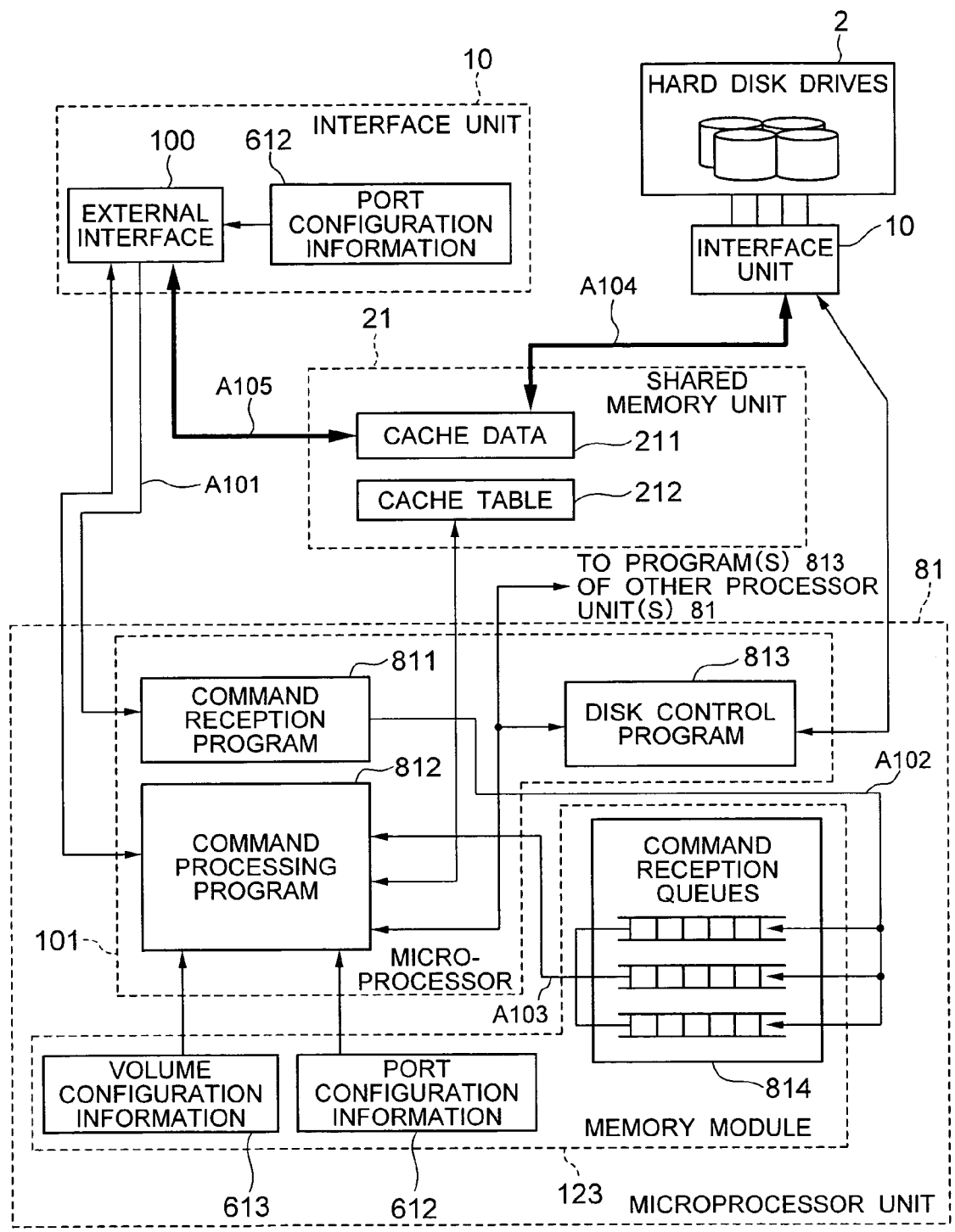
FIG. 8 is a block diagram representing operations involved in each program executed by the microprocessor unit 81 in the storage system 1 in the first embodiment of the present invention.

FIG. 8 is a block diagram representing operations involved in each program executed by the microprocessor unit 81 in the storage system 1 in this embodiment of the present invention.

The interface unit 10 of the storage system 1 receives a command from the server 3 connected thereto through the network. Specifically, the external interface 100 of the interface unit 10 receives a command transmitted by the server 3 which is connected to this external interface 100. Then, the external interface 100 references the port configuration information 612 to identify the "microprocessor number 6124" corresponded to the "external interface number 6121" assigned thereto. The external interface 100 transfers the received command to the microprocessor unit 81 which has the microprocessor 101 indicated by the identified "microprocessor number 6124" (A101).

Specifically, the external interface 100 generates an interrupt to the microprocessor unit 81 through the data transfer control unit 105. Upon receipt of the interrupt, the microprocessor 101 starts the command reception program 811. In the command reception program 811, the microprocessor 101 reads the command from the external interface 100, and registers the command in an associated command reception queue 814 (A102).

The command reception queue 814 holds the same number of queues as the number of assigned external interfaces 6142 of the microprocessor 101, such that the microprocessor 101 registers the command in a queue corresponding to the external interface 100 from which the command is received.

The microprocessor 101 of the microprocessor unit 81 checks each of the command reception queues 814 in order at all times. When some commands exist in an associated queue, the microprocessor 101 fetches the commands one by one for processing (A103). Specifically, the microprocessor 101 first determines whether or not data specified by a command exists in the cache data unit 211. The microprocessor 101 searches the cache table 212 using the external interface 100 from which the command is received, and the LUN, address, and transfer length information included in the command.

If the microprocessor 101 determines, as a result of searching the cache table 212, that there exists no data specified by the command in the cache data unit 211, the microprocessor 101 transfers the data from the hard disk drives 2 to the cache data unit 211 based on the volume configuration information 613. In this event, the microprocessor 101 searches for the microprocessor 101 assigned to the external interface 100 connected to the associated hard disk drives 2 from the volume configuration information 613, and calls the disk control program 813 of the microprocessor 101.

In the disk control program 813, the microprocessor 101 instructs the external interface 100 to transfer the data between the hard disk drive 2 and the cache data unit 211 (A104) in accordance with an instruction from the command processing program 812.

When the data specified by the command exists in the cache data unit 211, or after the disk control program 813 has completed the data transfer, the microprocessor 101 instructs the external interface 100 to transfer the data between the cache data unit 211 and the server 3 (A105). Upon completion of the data transfer, the microprocessor 101 terminates the command process, and continues to check again the command reception queues 814.

It should be noted in regard to the storage system 1 in this embodiment that a maximum number of commands which can be processed by the microprocessor 101 of the microprocessor unit 81 per unit time basically depends on the performance of the microprocessor 101. Also, a processing load on the disk control program 813 is sufficiently lighter than the command processing program 812. It can therefore be deemed that the number of commands which can be processed by each external interface 100 connected to the server 3 per unit time is inversely proportional to the number of assigned external interfaces 6142 of the microprocessor 101 which is assigned to that external interface 100.

Next, each program executed by the system management unit 60 will be described with reference to FIG. 9.

Figure 9:
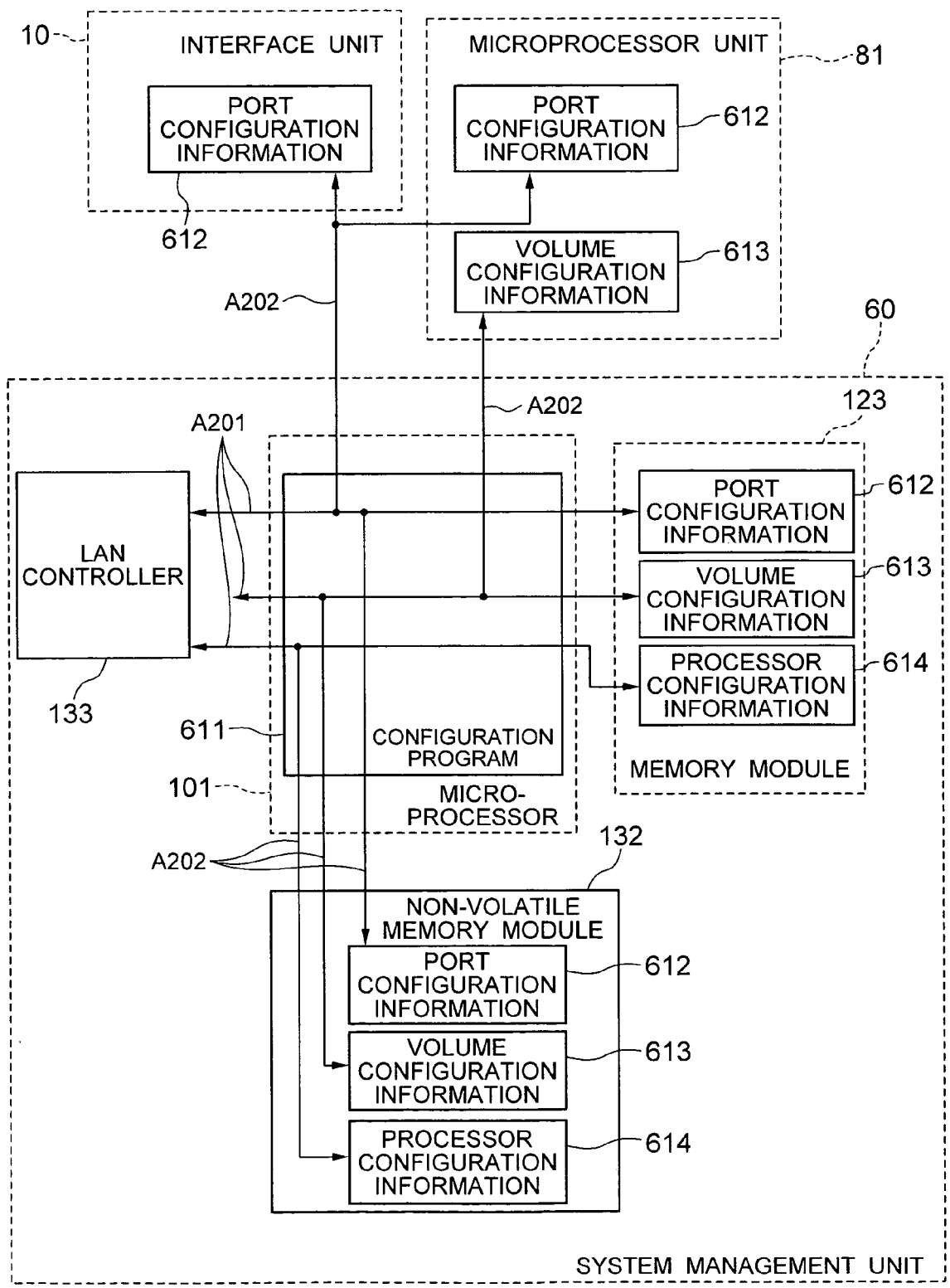
FIG. 9 is a block diagram representing operations involved in a configuration program executed by the system management unit 60 in the storage system 1 in the first embodiment of the present invention.

FIG. 9 is a block diagram representing operations involved in the configuration program executed by the system management unit 60 of the storage system 1 in the first embodiment.

The microprocessor 101 of the system management unit 60 starts the configuration program 611 when the LAN controller 133 accepts an access from the storage management console 4. The microprocessor 101 transmits the port configuration information 612, volume configuration information 613, and processor configuration information 614, stored in the memory module 123 of the system management unit 6, to the storage management console 4 in response to a request received from the storage management console 4 through the LAN controller 133 (A201).

The microprocessor 101 also modifies the information (port configuration information 612, volume configuration information 613, and processor configuration information 614) in accordance with a request from the storage management console 4 with the aid of the configuration program 611. When the port configuration information 612 and volume configuration information 613 should be modified, the microprocessor 101 also makes the same modifications to the port configuration information 612 and volume configuration information 613 stored in the non-volatile memory module 132 and the memory modules 123 of all the interface units 10 and microprocessor units 81 in the storage system 1 (A202).

Next, the configuration of the storage management console 4, and the structure of data held by the storage management console 4 will be described with reference to FIG. 10.

Figure 10:
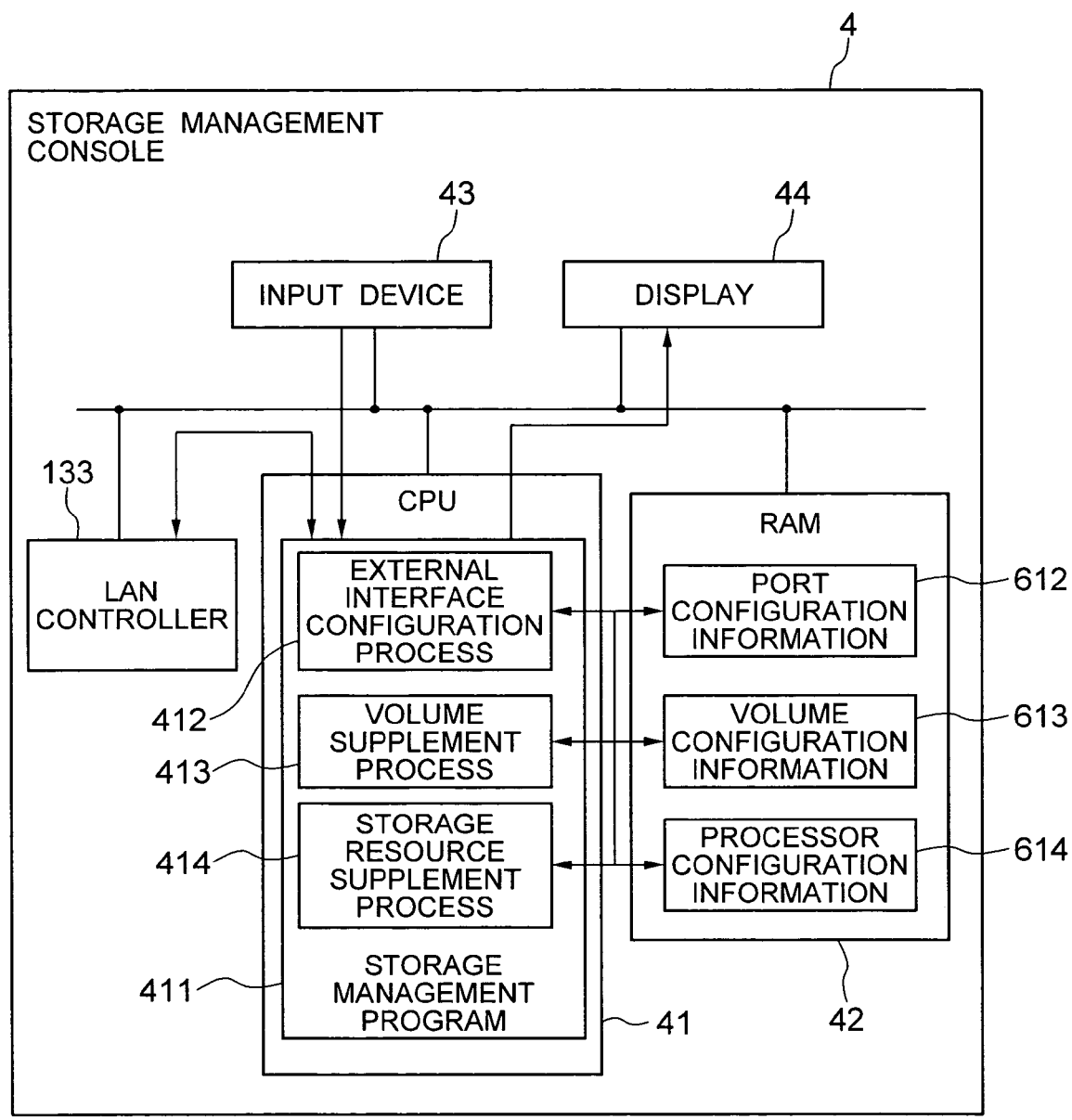
FIG. 10 is a block diagram illustrating the configuration of a storage management console 4 in the first embodiment of the present invention.

FIG. 10 is a block diagram illustrating the configuration of the storage management console 4 in this embodiment.

As illustrated, the storage management console 4 comprises an input device 43 with which the administrator enters data; a display 44 for displaying information for the administrator; a CPU 41; a RAM 43; and a LAN controller 133.

The CPU 41 executes a storage management program 411 to make a variety of requests to the storage system 1. The RAM 42 holds the port configuration information 612, volume configuration information 613, and processor configuration information 614 acquired from the storage system 1 with the aid of the storage management program 411 executed by the CPU 41. The RAM 42 also functions as a work area for the CPU 41 to execute the storage management program 411.

The input device 43 receives data entered by the administrator for selecting a variety of functions and establishing a variety of configurations for the storage system 1, and may be implemented, for example, by a keyboard, a mouse, a hard switch, and the like. The display 44, which is a device for displaying a variety of functions and a variety of setting screens provided by the storage system 1 for the administrator, may be implemented, for example, by a liquid crystal display or a CRT display.

The storage management program 411 causes the storage management console 4 to execute an external interface configuration process 412, a volume supplement process 413, and a storage resource supplement process 414.

The external interface configuration process 412 is executed when a new server 3 is connected to the storage system 1 for corresponding an external interface 100 connected to the server 3 to a microprocessor 101 assigned to a data input/output process for the external interface 100. The volume supplement process 413 sets a correspondence of the external interface 100 to the LUN and hard disk drives 2, such that a new volume can be used from the server 3. The storage resource supplement process 414 is started by the administrator after the external interface unit 10, hard disk drives 2, and microprocessor unit 81 have been added to the storage system 1. The foregoing external interface configuration process 412, volume supplement process 413, and storage resource supplement process 414 will be described later in greater detail.

Next, the processing flow of the external interface configuration process 412 according to this embodiment will be described in detail with reference to FIG. 11.

Figure 11:
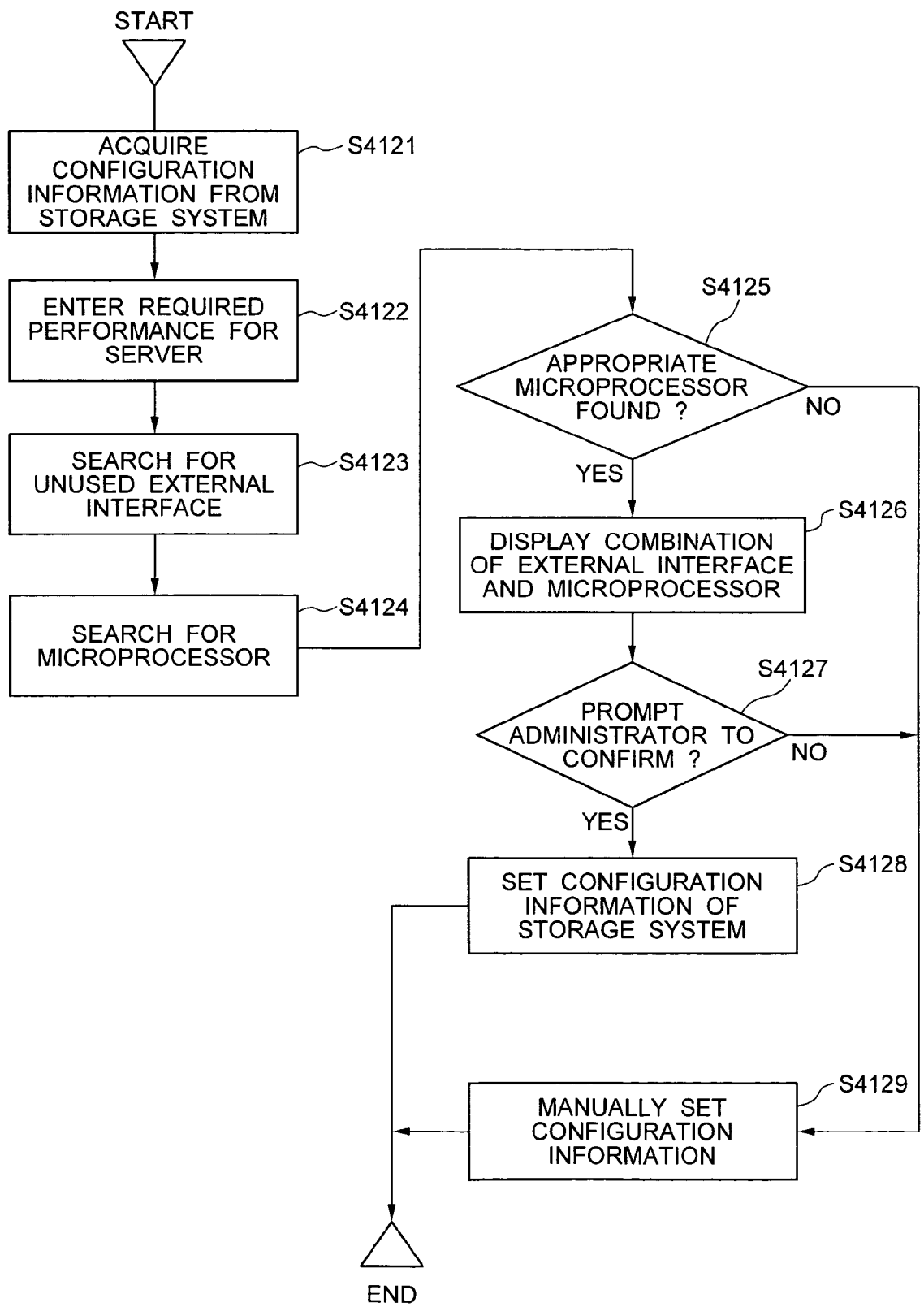
FIG. 11 is a flow chart illustrating a processing flow of an external interface configuration process executed by the storage management console in the first embodiment of the present invention.

FIG. 11 is a flow chart illustrating the flow of the external interface configuration process 412 executed by the storage management console 4 in this embodiment.

Upon receipt of a manipulation from the administrator, the CPU 41 starts a process provided by the storage management program 411. The CPU 41 runs the storage management program 411 to first communicate with the system management unit 60 of the storage system 1 through the LAN controller 133 to acquire the port configuration information 612, volume configuration information 613, and processor configuration information 614. The CPU 41 stores the acquired port configuration information 612, volume configuration information 613, and processor configuration information 514 in the RAM 42 (step 4121), and proceeds to the processing at step 4122. It should be noted that in the following description, the port configuration information 612, volume configuration information 613, and processor configuration information 614 may be simply called "storage system configuration information" as the case may be.

Specifically, the CPU 41 requests the system management unit 60 of the storage system 1 to transmit the "storage system configuration information" through the LAN controller 133 with the aid of the storage management program 411. The microprocessor 101 of the system management unit 60 accepts the above-mentioned request, and reads the "storage system configuration information" stored in the memory module 123 for transmission to the CPU 41 through the LAN controller 133 with the aid of the configuration program 611. Then, the CPU 41 receives the "storage system configuration information" transmitted by the system management unit 60 through the LAN controller 133, and stores "storage system configuration information" in the RAM 42 with the aid of the storage management program 411.

At step 4122, the CPU 41 receives required performance, entered by the administrator, for the server 3 which is to be additionally connected to the storage system 1 with the aid of the storage management program 411. Specifically, the CPU 41 displays a request message on the display 44 for requesting the administrator to enter required performance for the server 3, which is to be additionally connected to the storage system 1, with the aid of the storage management program 411, and waits for the administrator to enter the required performance. Then, the CPU 11 receives the required performance entered by the administrator through the input device 43 with the aid of the storage management program 411. Assume in the description of this embodiment that the required performance entered by the administrator is represented by data indicative of the number of commands which can be processed per second.

After receiving the required performance, the CPU 41 searches the port configuration information 612 stored in the RAM 42 to select an unused external IF 100 (step 4123) with the aid of the storage management program 411.

Next, the CPU 41 selects one microprocessor 101 of the storage system 1, and estimates calculated performance of the microprocessor 101 when the microprocessor 101 is newly assigned to the external interface 100, with the aid of the storage management program 411. In this embodiment, the calculated performance is derived using the processor configuration information 614 stored in the RAM 42. Specifically, the CPU 41 subtracts the "number of assigned external interfaces 6142 plus one" of the processor configuration information 614 from the previously measured "performance of the microprocessor 101," and defines the resulting value as the "calculated performance." Assume in this embodiment that the "performance of the microprocessor" is found by such a method as a measurement using prior art techniques.

Then, the CPU 41 determines whether or not the estimated "calculated performance" exceeds the "required performance" received from the administrator at step 4122. When the calculated performance exceeds the received "required performance," the CPU 41 extracts all the external interfaces 100 which have been already processed by the microprocessor 101 from the port configuration information 612. The CPU 41 determines whether or not the "calculated performance" exceeds the required performance 6123 of each external interface 100. The CPU 41 repeats a similar search operation for each microprocessor 101 until the CPU 41 finds a microprocessor 101 which meets both conditions (step 4124).

As described above, in this embodiment, the CPU 41 estimates the "calculated performance" for a selected microprocessor 101, and compares the estimated "calculated performance" with the "required performance" received from the administrator. Also, in this embodiment, in addition to the comparison of the "calculated performance" with the "required performance" received from the administrator, the CPU 41 also compares the "calculated performance" with the required performance 6123 of the external interface 100 to which the microprocessor 101 has been already assigned. Thus, in this embodiment, when a microprocessor 101 is newly assigned to an external interface 100, the required performance of the previously set external interfaces 100 can be taken into consideration in establishing an appropriate configuration.

Eventually, when the CPU 41 finds a microprocessor 101 which meets the conditions as a result of the determination, the CPU 41 displays a combination of the selected external interface 100 and microprocessor 101 on the display 44 (steps 4125, 4126).

Then, the CPU 41 displays a message on the display 44 for asking the administrator for a permission to set the displayed combination into the storage system 1, and waits for the administrator to enter the permission for the configuration (step 4127).

Upon receipt of data indicative of the permission for the displayed combination from the administrator, the CPU 41 communicates with the storage system 1 through the LAN controller 133 to update the port configuration information 612 and processor configuration information 614 held in the storage system 1.

Specifically, the CPU 41 transmits data for requesting the system management unit 60 of the storage system 1 to update the port configuration information 612 and processor configuration information 614 through the LAN controller 133 with the aid of the storage management program 411. The system management unit 60 receives the data for requesting the update, and updates the port configuration information 612 and processor configuration information 614 stored in each memory module 123 of the storage system 1 with the aid of the configuration program 611 (step 4128).

The port configuration information 612 and processor configuration information 614 are updated in the following manner. The "occupation flag 6122" indicative of "used" is stored in the entry 612*b* corresponding to the external interface 100 selected at step 4123. Also, the "required performance" received at step 4122 is stored in the entry 612*c* corresponding to the entry 612*b*. Further, the "microprocessor number 6124" given to the microprocessor 110 selected at step 4124 is stored in the entry 612*d* corresponding to the entry 612*b*.

Also, for the update of the processor configuration information 614, the "number of assigned external interfaces 6142 plus one" is stored in the entry 614*b* corresponding to the microprocessor 101 selected at step 4124. Upon completion of the update to the configuration information, the CPU 41 terminates the external interface configuration process 412.

If the CPU 41 cannot find any microprocessor 101 which meets the conditions at step 4125, or if the administrator rejects the combination displayed at step 4127, the CPU 41 displays a message on the display 44 for requesting the administrator to make manual settings. Upon receipt of updated data manually entered by the administrator for the port configuration information 612 and processor configuration information 614, the CPU 41 requests the system management unit 60 of the storage system 1 to update the port configuration information 612 and processor configuration information 614. The system management unit 60 accepts the update request, and updates the port configuration information 612 and processor configuration information 614 stored in each memory module 123 of the storage system 1 with the aid of the configuration program 611 (step 4129). Upon completion of the update to the port configuration information 612 and processor configuration information 614, the CPU 41 terminates the external interface configuration process 412.

When the CPU 41 cannot find any microprocessor 101 which meets the conditions at step 4125, the CPU 41 may displays a message on the display 44 for proposing the installation of an additional microprocessor unit 81.

Next, the flow of the volume supplement process according to this embodiment will be described with reference to FIG. 12.

Figure 12:
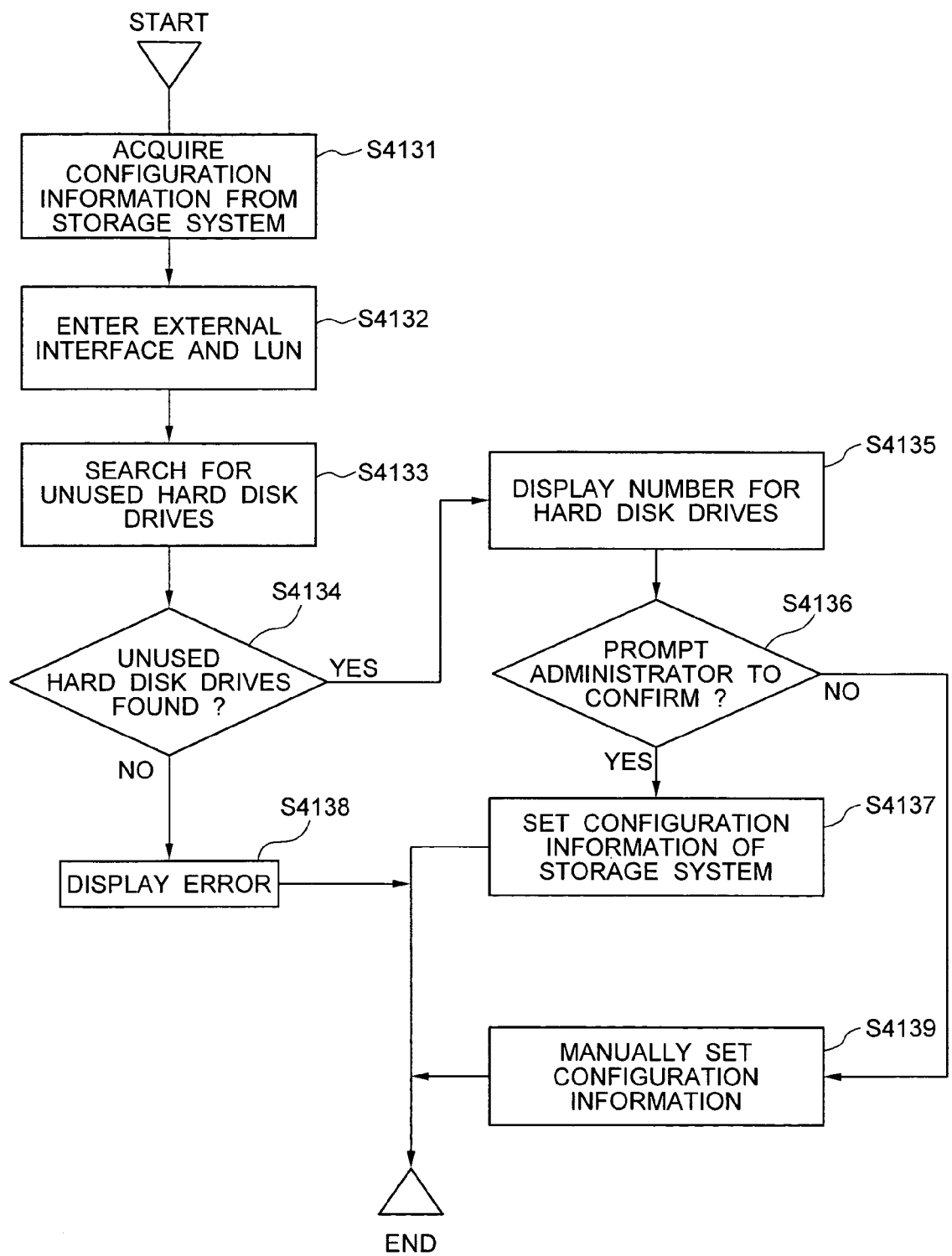
FIG. 12 is a flow chart illustrating a processing flow of a volume supplement process executed by the storage management console in the first embodiment of the present invention.

FIG. 12 is a flow chart illustrating the flow of the volume supplement process executed by the storage management console 4 in this embodiment.

Upon receipt of a manipulation from the administrator, the CPU 41 starts a process provided by the storage management program 411. Then, the CPU 41 executes similar processing to that at step 4121 described with reference to FIG. 11 to acquire the "storage system configuration information" from the storage system 1 and store the "storage system configuration information" in the RAM 42 (step 4131).

Next, the CPU 41 receives the number and LUN for an external interface 100 connected to the server 3 which requests for the creation of a new volume, entered by the administrator, with the aid of the storage management program 411 (step 4132). Specifically, the CPU 41 outputs a message for requesting the administrator to enter the number and LUN for the external interface 100 connected to the server 3 which requests for the creation of a new volume to the display 44, and waits for the administrator to enter these data with the aid of the storage management program 411. Then, the CPU 41 receives the number and LUN for the external interface 100 entered by the administrator through the input device 43 with the aid of the storage management program 411.

As the administrator has entered the number and LUN for the external interface 100, the CPU 41 searches the volume configuration information 613 stored in the RAM 42 for unused hard disk drives 2. Then, the CPU 41 proceeds to the processing at step 4135 if unused hard disk drives 2 are found, whereas the CPU 41 proceeds to the processing at step 4138 if there are no unused hard disk drives 2 (steps 4133, 3134).

At step 4135, the CPU 41 displays a combination of the number for hard disk drives 6131 of the found hard disk drives 2 and the received number and LUN for the external interface 100, and proceeds to step 4136.

On the other hand, at step 4138 to which the CPU 41 proceeds when no unused hard disk drives 2 are found, the CPU 41 displays an error on the display 44, followed by termination of the process.

At step 4136, the CPU 41 displays a message on the display 44 for requesting the administrator for a permission to set the displayed combination of number for hard disk drives 6131 and the number and LUN for the external interface 100 into the storage system 1, and waits for the administrator to enter a reply. When the CPU 41 receives data entered by the administrator to indicate the permission to set the displayed combination, the CPU 41 proceeds to step 4137. Conversely, upon receipt of data indicating that the foregoing combination should not be set into the storage system 1, the CPU 41 proceeds to step 4139.

At step 4137, the CPU 41 communicates with the system management unit 60 of the storage system 1 through the LAN controller 133 to update the volume configuration information 613 stored in the memory module 123 of the storage system 1. Specifically, the CPU 41 requests the system management unit 60 of the storage system 1 to update the volume configuration information 613 through the LAN controller 133. The microprocessor 101 of the system management 60 accepts the update request to update the volume configuration information 613 stored in each memory module 123 of the storage system 1 with the aid of the configuration program 611. Upon completion of the update to the volume configuration information 613, the CPU 41 terminates the volume supplement process 413.

The volume configuration information 613 is updated in the following manner. The "occupation flag 6132" stored in the entry 613b of the volume configuration information 613 corresponding to the hard disk drives 2 selected at step 4133 is changed from "unused" to "used." Also, the "number for the external interface 100" and "LUN" entered by the administrator at step 4132 are stored in the "external interface number 6135" in the entry 613d and the "LUN 6136" in the entry 613f of the volume configuration information 613 corresponding to the hard disk drives 2 selected at step 4133.

Next, description will be made on the processing at step 4139 to which the CPU 41 proceeds when the CPU 41 receives at step 4136 data indicating that the combination displayed on the display 44 should not be set into the storage system 1.

At step 4139, the CPU 41 receives manual settings in a manner similar to step 4129 described with reference to FIG. 11, and updates the volume configuration information 613 held by the storage system 1 to the received contents. Then, upon completion of the update to the volume configuration information 613, the CPU 41 terminates the volume supplement process 413.

Alternatively, if unused hard disk drives 2 are not found at step 4134, the CPU 41 may display a message on the display 44 for proposing the installation of additional hard disk drives 2.

Next, a flow of the storage resource supplement process according to this embodiment will be described with reference to FIG. 13.

Figure 13:
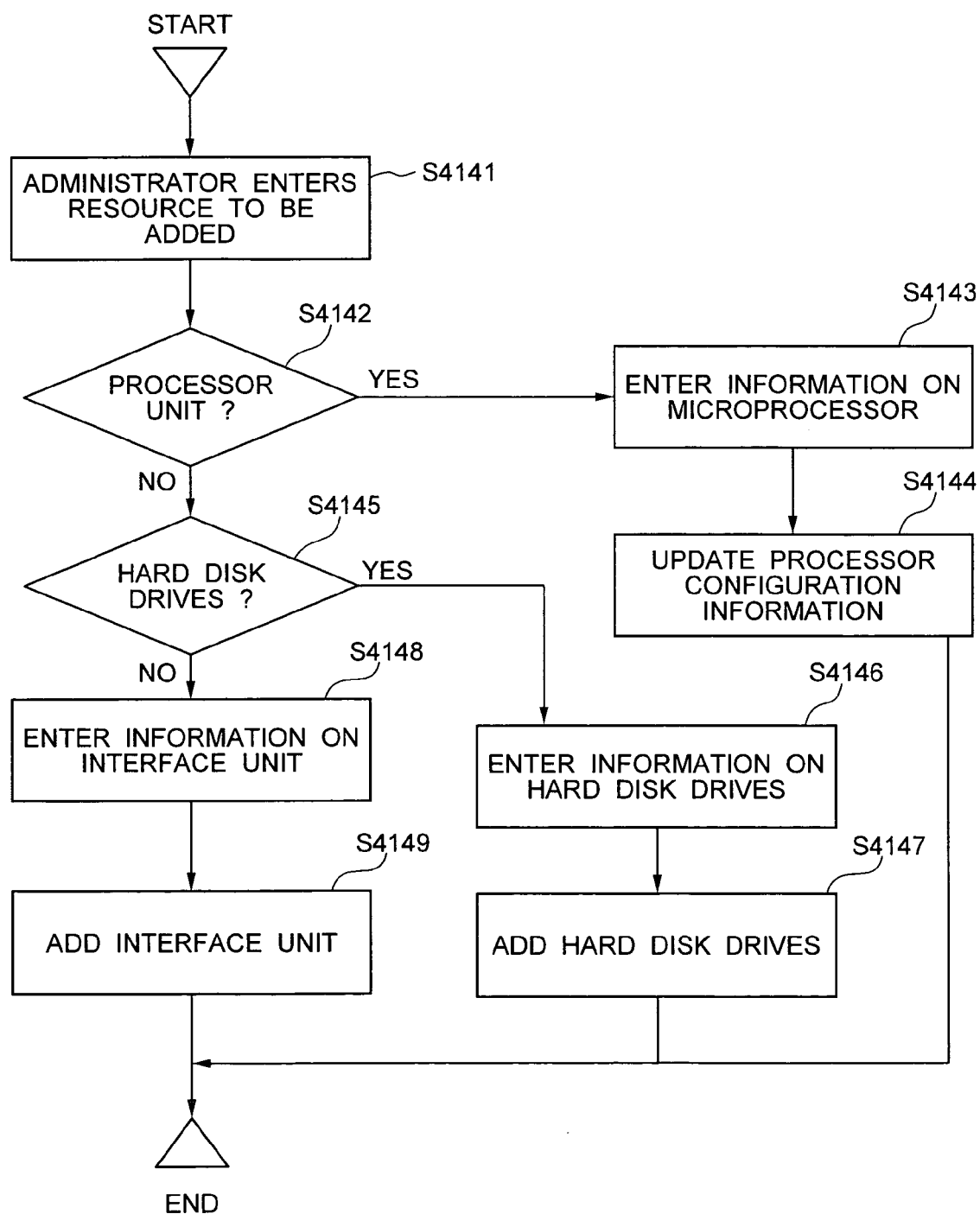
FIG. 13 is a flow chart illustrating a processing flow of a storage resource supplement process executed by the storage management console in the first embodiment of the present invention.

FIG. 13 is a flow chart illustrating the flow of the storage resource supplement process executed by the storage management console 4 in this embodiment.

Upon receipt of a manipulation from the administrator, the CPU 41 starts a process provided by the storage management program 411 to receive the type of a resource to be added, which is entered by the administrator (step 4141). Specifically, the CPU 41 displays a setting screen on the display 44 for receiving an additional storage resource, and receives the type of resource to be added, which is entered by the administrator.

Then, the CPU 41 determines whether or not the type of resource received at step 4141 is addition of "microprocessor unit 81." The CPU 41 proceeds to step 4143 if it determines that the type of resource received at step 4141 is the addition of "microprocessor unit 81." On the other hand, the CPU 41 proceeds to sep 4145 if it does not determine the addition of "microprocessor unit 81" (step 4142).

At step 4143, the CPU 41 receives the microprocessor number 6141 of a microprocessor 101 to be added, entered by the administrator (step 4143). Specifically, the CPU 41 displays a message on the display 44 for requesting the administrator to enter the microprocessor number 6141 of the microprocessor 101 to be added. Then, the CPU 41 receives the microprocessor number 6141 entered by the administrator through the input device 43.

As the administrator has entered the microprocessor number 6141, the CPU 41 communicates with the system management unit 60 of the storage system 1 through the LAN controller 133 to update the processor configuration information 614 (step 4144).

Specifically, the CPU 41 requests the system management unit 60 of the storage system 1 to update the processor configuration information 614 through the LAN controller 133. The microprocessor 101 of the system management unit 60 accepts the update request, and updates the processor management information 614 stored in the memory module 123 of the system management unit 60 with the aid of the configuration program 611. It should be noted that a new set of entries is added to the processor configuration information 614 by this update to the processor configuration information 614. The newly added entry 614a stores the microprocessor number 6141 entered by the administrator. Also, the "number of assigned external interfaces 61420" is set to "0" in a newly added corresponding entry 614b. Upon completion of the settings for the processor configuration information 614, the CPU 41 terminates the storage resource supplement process 414.

On the other hand, if the type of resource received at step 4124 is not the "addition of microprocessor 81," the CPU 41 determines whether or not the received type of resource is "addition of hard disk drives 2." Then, the CPU 41 proceeds to step 4146 if the received type of resource is the "addition of hard disk drives 2," and to step 4148 if not the "addition of hard disk drives 2" (step 4145).

At step 4146, the CPU 41 receives data on hard disk drives 2 to be added, entered by the administrator (step 4146). Specifically, the CPU 41 displays a message on the display 44 for requesting the administrator to enter the "number for hard disk drives 6131" of the hard disk drives 2 to be added; the "number for interface unit 6134" of the interface unit 10 which connects the hard disk drives 2 to be added; and the "microprocessor number 6133" of the microprocessor 101 which makes accesses to the hard disk drives 2 to be added. Then, the CPU 41 receives the "number for hard disk drives 6131," "number for interface unit 6134," and "microprocessor number 6133" entered by the administrator through the input device 43.

As the administrator has entered the foregoing numbers, the CPU 41 communicates with the system management unit 60 of the storage system 1 through the LAN controller 133 to update the volume configuration information 613 (step 4147). Specifically, the CPU 41 forces the system management unit 60 of the storage system 1 to update the volume configuration information 613, in a similar procedure to the aforementioned step 4144.

It should be noted that a new set of entries is added to the volume configuration information 613 by this update to the volume configuration information 613. The newly added entries 613a, 613c, 613d stores the "number for hard disk drives 6131," "microprocessor number 6133," and "number for interface unit 6134" entered at step 4146, respectively. Also, the "occupation flag 6132" indicative of "unused" is stored in a new entry 613b. Upon completion of the settings for the volume configuration information 613, the CPU 41 terminates the storage resource supplement process 414.

Next, description will be made on the processing at step 4148 to which the CPU 41 proceeds when the type of resource received at step 4145 is not the "addition of hard disk drives 2."

At step 4148, the CPU 41 determines that the type of resource received at step 4141 is "addition of interface unit 10." Then, the CPU 41 receives data on an interface unit 10 to be added, entered by the administrator (step 4148). Specifically, the CPU 41 displays a message on the display 44 for requesting the administrator to enter the "number of external interfaces 100" of the interface unit 10 to be added, and the "external interface number 6121" of each external interface 100. Then, the CPU 41 receives the "number of external interfaces 100" and "external interface number 6121" entered by the administrator through the input device 43.

As the administrator has entered the data, the CPU 41 communicates with the system management unit 60 of the storage system 1 through the LAN controller 133 to update the port configuration information 612. Specifically, the CPU 41 forces the system management unit 60 of the storage system 1 to update the port configuration information 612 in a similar procedure to the aforementioned step 4144 (step 4149).

It should be noted that a set of entries is added to the port configuration information 612 for the data entered by the administrator at step 4148 by this update to the port configuration information 612. An added entry 612a stores the received "external interface number 6121"; and an added entry 612b stores the "occupation flag 6122" indicative of "unused." Upon completion of the settings for the port configuration information 612, the CPU 41 terminates the storage resource supplement process 414.

As described above, in this embodiment, by executing the external interface configuration process described with reference to FIG. 11 the CPU 41 can connect a new server 3 to the storage system 1, and to set the storage system configuration information for the storage system 1. Also, by executing the volume supplement process described with reference to FIG. 12, the CPU 41 can set a volume provided to the newly connected server 3.

When a new server 3 is additionally connected to the storage system 1 in this embodiment, the administrator starts the storage management program 411 on the storage management console 4. The CPU 41 of the storage management console 4 acquires the storage system configuration information from the storage system 1 in accordance with the aforementioned procedure at step 4121. The CPU 41 of the storage management console 4 executes the external interface configuration process 412 to receive required performance entered by the administrator with the aid of the storage management program 411.

The CPU 41 of the storage management console 4 calculates a combination of an external interface 100 and a microprocessor 101 which meet the conditions, and proposes this combination to the administrator. Upon receipt of the approval for the displayed combination from the administrator, the storage management console 4 sets the configuration information for the storage system 1.

Next, for providing a volume to the new server 3, the administrator starts the storage management program 411 on the storage management console 4 to execute the aforementioned volume supplement process 413 to add a volume for the external interface 100 and a proper LUN which have been set by the aforementioned external interface configuration process 412.

Finally, the administrator connects the new server 3 to the external interface 100 set by the external interface configuration process 412, and sets the server 3 to use the LUN entered by the volume supplement process 413, thereby completing the addition of the server 3.

As described above, in the foregoing embodiment, the interface unit 10 connected to the server 3, the interface unit 10 connected to the hard disk drives 2, and the microprocessor 101 assigned to the data input/output process of the interface unit 10 are interconnected through the switch unit 5. In other words, in this embodiment, the microprocessor 101 dedicated to the data input/output process is not fixedly assigned to the interface unit 10 connected to the server 3, but a free combination can be set for the interface unit 10 and the microprocessor 101 dedicated to the processing for the interface unit 10. Thus, according to the foregoing embodiment, the resources provided by the storage system 1 can be utilized in an efficient manner.

Also, in the foregoing embodiment, the storage management console 4 calculates an optimal combination of the external interface 100, microprocessor 101, and hard disk drives 2 for the storage system 1, and proposes this combination to the administrator. Thus, for adding a server 3 to the storage system 1 or the like, the storage system 1 can be configured without being conscious of a combination of the external interface 100 connected to the server 3, microprocessor 101, and hard disk drives 2. In other words, according to the foregoing embodiment, it is possible to readily configure the storage system for efficiently utilizing the resources provided by the storage system 1. Also, according to the foregoing embodiment, when the storage system 1 is increased in scale, the storage system can be readily configured to efficiently utilize the resources.

Second Embodiment

Next, a second embodiment of the present invention will be described below.

Figure 14:
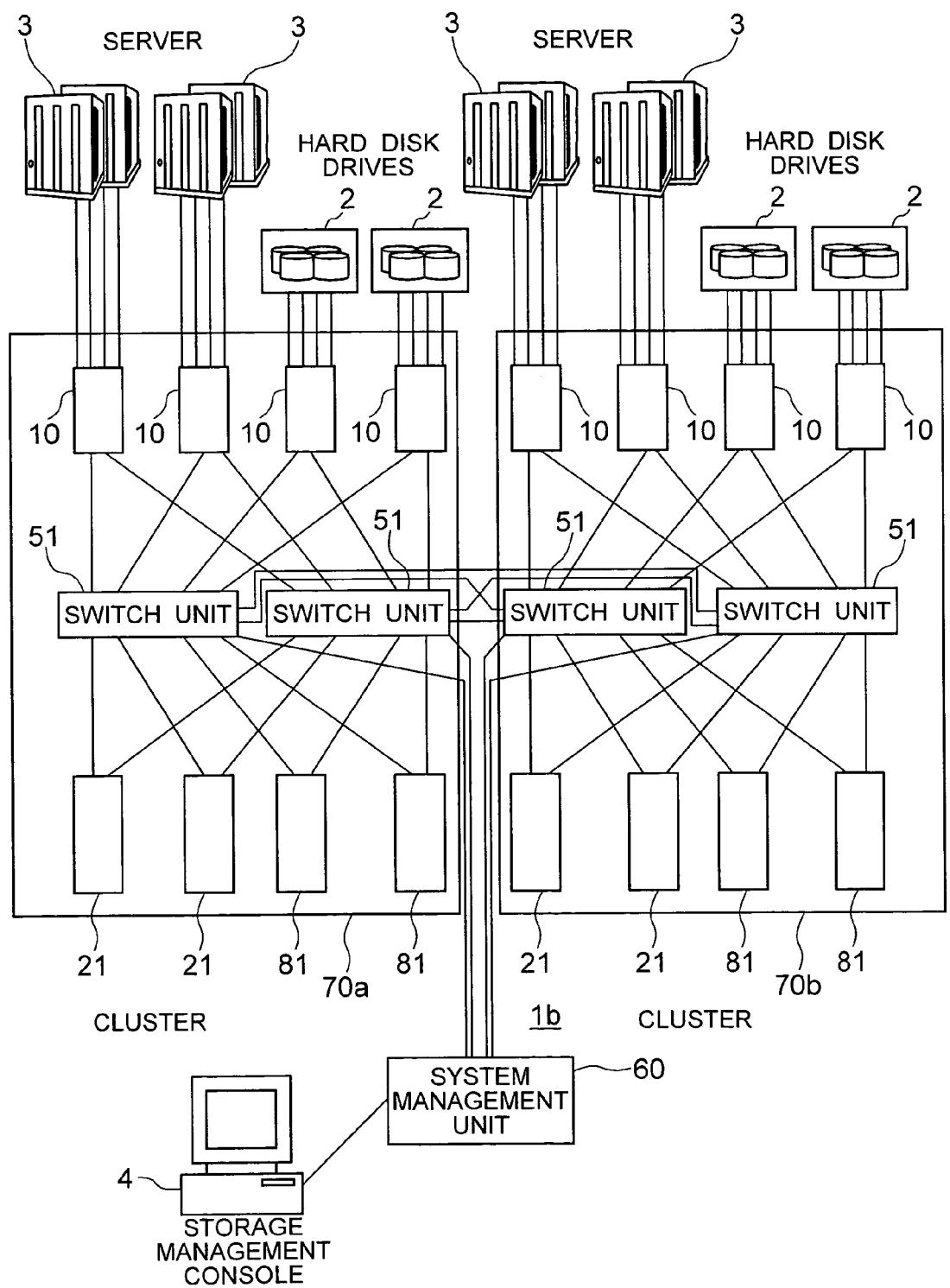
FIG. 14 is a block diagram illustrating the configuration of a computer system according to a second embodiment of the present invention.

FIG. 14 is a block diagram illustrating the configuration of a computer system according to the second embodiment of the present invention. The computer system according to the second embodiment differs in the configuration of the storage system from the computer system according to the first embodiment. In the description of the second embodiment, the same components as those in the first embodiment are designated the same reference numerals.

As illustrated, the storage system 1*b* in the second embodiment comprises two clusters 70*a*, 70*b*, each of which excludes the system management unit 60 from the storage system 1 in the first embodiment; and a system management unit 60 connected to a switch unit 51 included in each of the clusters 70*a*, 70*b*. Then, the switch unit 51 included in the cluster 70*a* is connected to the switch unit 51 included in the cluster 70*b* through an inter-cluster path.

Respective components which make up the computer system of the second embodiment are identical in function to those of the first embodiment illustrated in FIGS. 2 to 6. The structure of each data handled by the storage system 1*b* and storage management console 4 is identical to that of the storage system 1 and storage management console 4 in the first embodiment. The programs executed in the storage system 1*b* are also identical to those in the first embodiment. A storage management program 41 installed in the storage management console 4 in the second embodiment is similar to the counterpart in the first embodiment except for some differences in part of the processing in the external interface configuration process 412 and volume supplement process 413. Therefore, the following description will be centered on such differences between the two embodiments.

In regard to accesses from the illustrated server 3 to the hard disk drives 2, an access using the inter-cluster path has a problem of a slower response than an access to the hard disk drives 2 using only the switch unit 51 in the same cluster 70. This is because the bandwidth of the access using the inter-cluster path is narrower than the access to the hard disk drives 2 using only the switch unit 51 in the same cluster 70.

For this reason, if there are a large number of volumes which are set in combination of the external interface 100 connected to the server 3, the microprocessor 101 located in the different cluster 70, and the hard disk drives 2, the bandwidth of the inter-cluster path and the response can cause a bottleneck to degrade the performance of the storage system 1*b*.

In the second embodiment, the storage management console 4 sets volumes in the storage system 1*b* so as to avoid the combination as mentioned above, thereby preventing the storage system 1*b* from being degraded in performance. In the following, processing flows of the external interface configuration process 412 and volume supplement process 413 executed by the storage management console 4 in the second embodiment will be described with reference to FIGS. 15 and 16, respectively.

Assume in the second embodiment that the cluster 70*a*, 70*b* to which an associated microprocessor 101, external interface 100, and hard disk drives 2 belong can be identified from microprocessor numbers 6124, 6133, external interface number 6121, and number for hard disk drives 6131. Specifically, it has been previously defined that when the respective numbers are in a range of 1 to 100, the associated components (microprocessor 101, external interface 100, hard disk drives 2) belong to the cluster 70*a*, whereas when the respective numbers are in a range of 101 to 200, the associated components (microprocessor 101, external interface 100, hard disk drives 2) belong to the cluster 70*b*.

Figure 15:
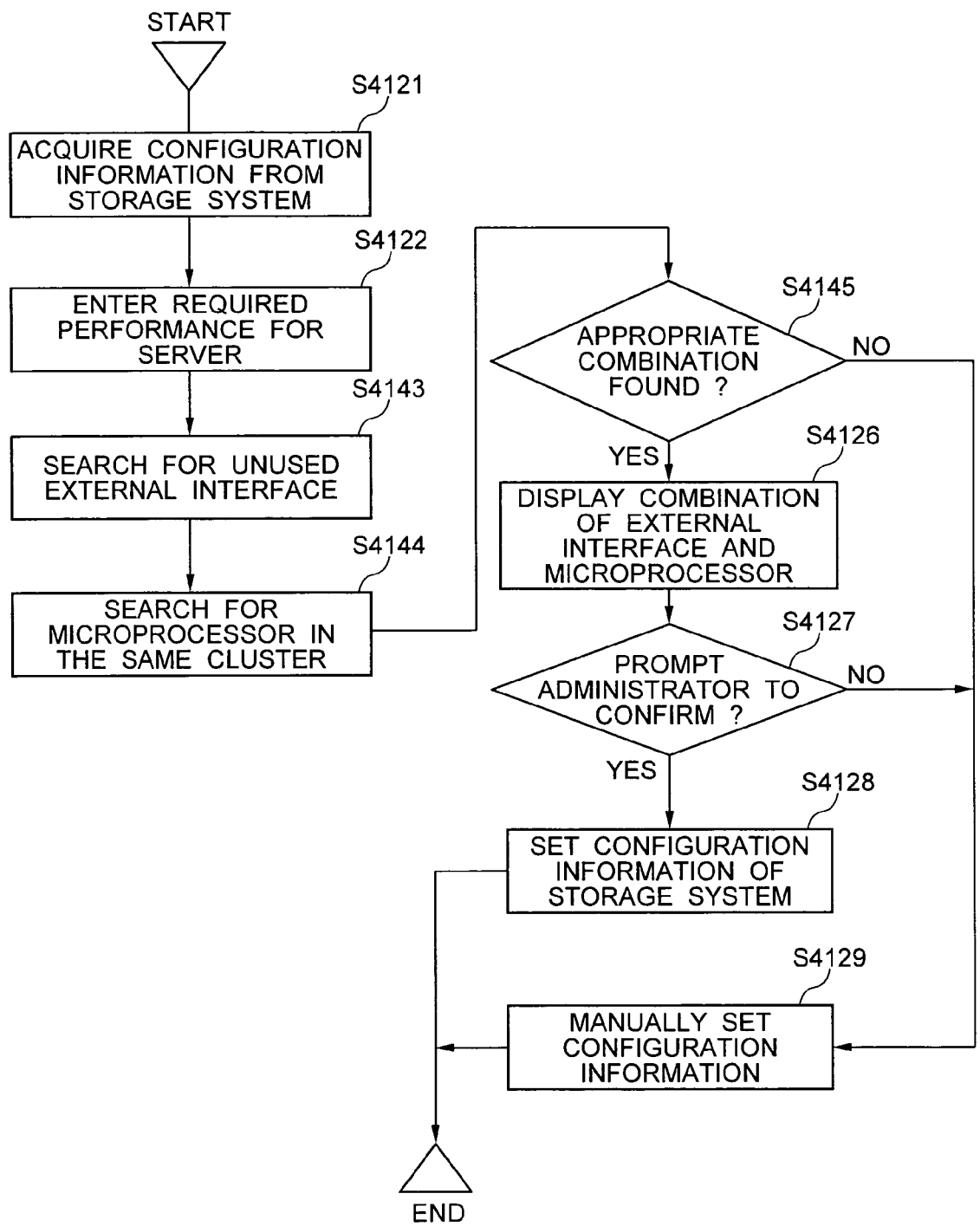
FIG. 15 is a flow chart illustrating a processing flow of an external interface configuration process in the second embodiment of the present invention.

FIG. 15 is a flow chart illustrating the flow of the external interface configuration process in the second embodiment of the present invention.

First, the CPU 41 of the storage management console 4 performs the same processing as that at steps 4121, 4122 shown in FIG. 11 to acquire the storage system configuration information from the storage system 1*b*, and to receive required performance for the server 3, entered by the administrator (steps 4121, 4122).

Next, the CPU 41 of the storage management console 4 receives the required performance, and then searches the port configuration information 612 stored in the RAM 42 to select unused external interfaces 100 from both the clusters 70*a*, 70*b* with the aid of the storage management program 411. When there are a plurality of unused external interfaces 100, the CPU 41 selects all such unused external interfaces 100 (step 4143).

Next, the CPU 41 selects all microprocessors 101 which meet the required performance from both the clusters 70*a*, 70*b* with the aid of the storage management program 411 (step 4144). The same method as that at step 4124 in FIG. 11 is used to select the microprocessors 101 which meet the required performance.

Next, the CPU 41 determines whether or not combinations of the external interfaces 100 and microprocessors 101 selected at steps 4143, 4144 include those made up of the two components that belong to the same cluster (step 4145). Then, the CPU 41 performs similar processing to that at steps 4126 to 4129 shown in FIG. 11.

Next, the volume supplement process will be described with reference to FIG. 16.

Figure 16:
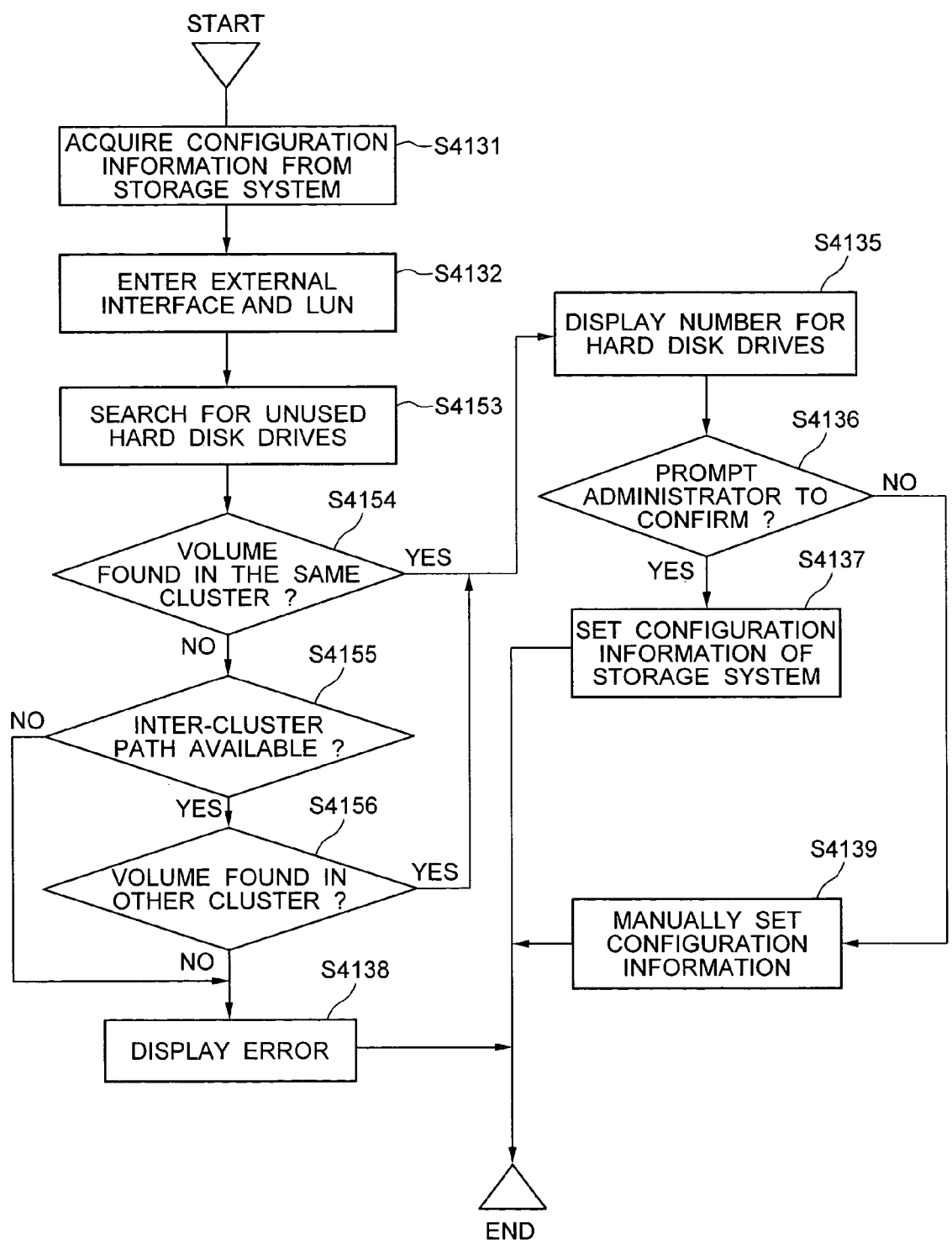
FIG. 16 is a flow chart illustrating a processing flow of a volume supplement process in the second embodiment of the present invention.

FIG. 16 is a flow chart illustrating the flow of the volume supplement process in the second embodiment of the present invention.

First, the CPU 41 of the storage management console 4 performs the same processing as that at steps 4131, 4132 shown in FIG. 12 to acquire the storage system configuration information from the storage system 1*b*, and to receive the "number for external interface 100" and "LUN" entered by the administrator.

The CPU 41 of the storage management console 4 receives the entered "number for external interface 100" and "LUN," and then searches the volume configuration information 613 stored in the RAM 42 to select unused hard disk drives 2 from both the clusters 70*a*, 70*b* with the aid of the storage management program 411. When there are a plurality of unused hard disk drives 2, the CPU 41 selects all such unused hard disk drives 2 (step 4153).

Next, the CPU 41 searches the hard disk drives 2 selected at step 4153 for those which belong to the same cluster as the external interface 100 specified by the administrator at step 4132, determines whether or not such hard disk drives 2 exist, and proceeds to step 4135 if they exist. On the other hand, the CPU 41 proceeds to the processing at step 4155 if there is no hard disk drives 2 which belong to the same cluster as the external interface 100 specified by the administrator at step 4132 within the selected hard disk drives 2 (step 4154).

At step 4135, the CPU 41 displays the numbers for hard disk drives on the display 44 in a manner similar to the first embodiment (step 4135). Subsequent to step 4135, the CPU 41 performs the same processing as in the first embodiment, i.e., the processing at steps 4136 to 4139 shown in FIG. 12.

Description will now be made on the processing at step 4155 to which the CPU 41 proceeds when the CPU 41 cannot find any hard disk drives 2 which meet the condition at step 4154. At step 4155, the CPU 41 determines whether or not the path between the clusters 70a, 70b is available with the aid of the storage management program 411. Specifically, the CPU 41 checks the external interface 100 in each entry in use from the port configuration information 612 stored in the RAM 42 with the aid of the storage management program 411. The CPU 41 counts the number of entries which indicate the external interface 100 and hard disk drives 2 included in the different clusters 70a, 70b. Then, the CPU 41 confirms whether or not the counted number is equal to or less than a design critical value with the aid of the storage management program 411. The CPU 41 proceeds to step 4156 when the counted number is equal to or less than the design critical value, determining that the inter-cluster path is available. On the other hand, the CPU 41 proceeds to step 4138 when the counted value exceeds the design critical value, determining that the inter-cluster path is not available.

The design critical value refers to a value determined by the bandwidth of the inter-cluster path, and can be measured by prior art techniques. In the second embodiment, the design critical value is assumed to be a constant which has been previously set in the storage management console 4. This design critical value may be set in the storage management console 4 by default, or may be set by the administrator into the storage management console 4 through the input device 43. Also, for determining at step 4155 whether or not the inter-cluster path is available, the CPU 41 may display a message on the display 44 for asking for a permission to use the inter-cluster path, such that the determination is made by the permission from the administrator.

At step 4156, the CPU 41 searches the hard disk drives 2 selected at step 4153 for those hard disk drives 2 which belong to the cluster 70 different from the cluster 70 which contains the external interface 100 specified by the administrator at step 4132, and determines whether or not such hard disk drives 2 exist. The CPU 41 proceeds to step 4135 when it determines that such hard disk drives 2 exist, and to step 4138 when it determines that such hard disk drives 2 do not exist.

At step 4138, the CPU 41 displays an error message on the display 44 with the aid of the storage management program 411, followed by termination of the volume supplement process.

As described above, the storage system 1b in the second embodiment has the clusters 70a, 70b which can be connected to each other. With this configuration, according to the second embodiment, a storage system can be readily built in conformity to a scale requested by the user. In other words, according to the second embodiment, the storage system can be readily scaled up or down in accordance with the amount of data handled by a particular user, the amount of transactions, and the like.

Also, according to the second embodiment, the storage management console 4 prevents a configuration with a combination of a microprocessor 101 and hard disk drives 2 which belong to different clusters 70. It is therefore possible to prevent degraded performance due to the inter-cluster path according to the second embodiment. In other words, according to the second embodiment, the administrator can configure the storage system 1b without taking into consideration the influence of the inter-cluster path.

While the second embodiment has been described in connection with the storage system 1b which has two clusters 70a, 70b, the present invention is not particularly limited to such a storage system. For example, the storage system 1b may have three or more clusters 70. In this configuration, the storage system 1b can be managed as well in a similar manner to the foregoing.

Third Embodiment

Next, a third embodiment of the present invention will be described below.

Figure 17:
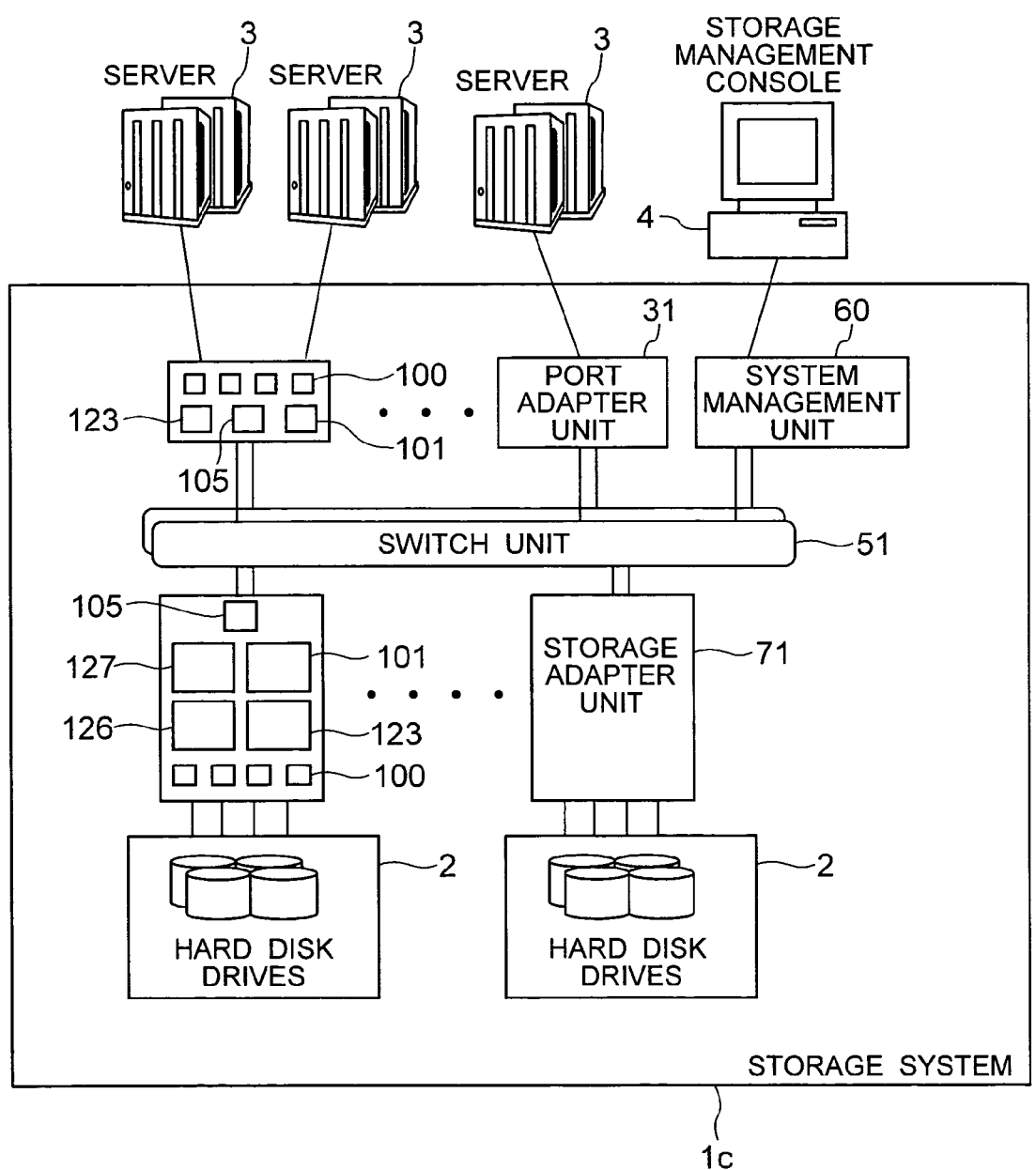
FIG. 17 is a block diagram illustrating the configuration of a computer system according to a third embodiment of the present invention.

FIG. 17 is a block diagram illustrating the configuration of a computer system according to the third embodiment of the present invention. In the description of the third embodiment, the same components as those in the first embodiment are designated the same reference numerals.

As illustrated, the computer system comprises a storage system 1c, at least one server 3, and a storage management console 4. Similar to the first and second embodiments, in the computer system according to the third embodiment, the server 3 and storage management console 4 are connected to the storage system 1c. The computer system according to the third embodiment is identical to that of the first embodiment except for some differences in the configuration of the storage system 1c and the processes performed by the storage management console 4. Therefore, the following description will be centered on such differences between the two embodiments.

The storage system 1c in the third embodiment comprises port adapter units 31; a switch unit 51; a system management unit 60; storage adapter units 71; and hard disk drives 2. The port adapter units 31, system management unit 60, and storage adapter units 71 are interconnected through the switch unit 51. The switch unit 51, system management unit 60, and hard disk drives 2 are similar to those in the first embodiment. Each of the port adapter units 31 interconnects the storage system 1c and a server 3 connected thereto to communicate commands and data therebetween. Each of the storage adapter units 71 is connected to the associated hard disk drives 2 to communicate commands and data therebetween.

Next, the port adapter unit 31 in the third embodiment will be described in terms of the configuration in detail with reference to FIG. 18.

Figure 18:
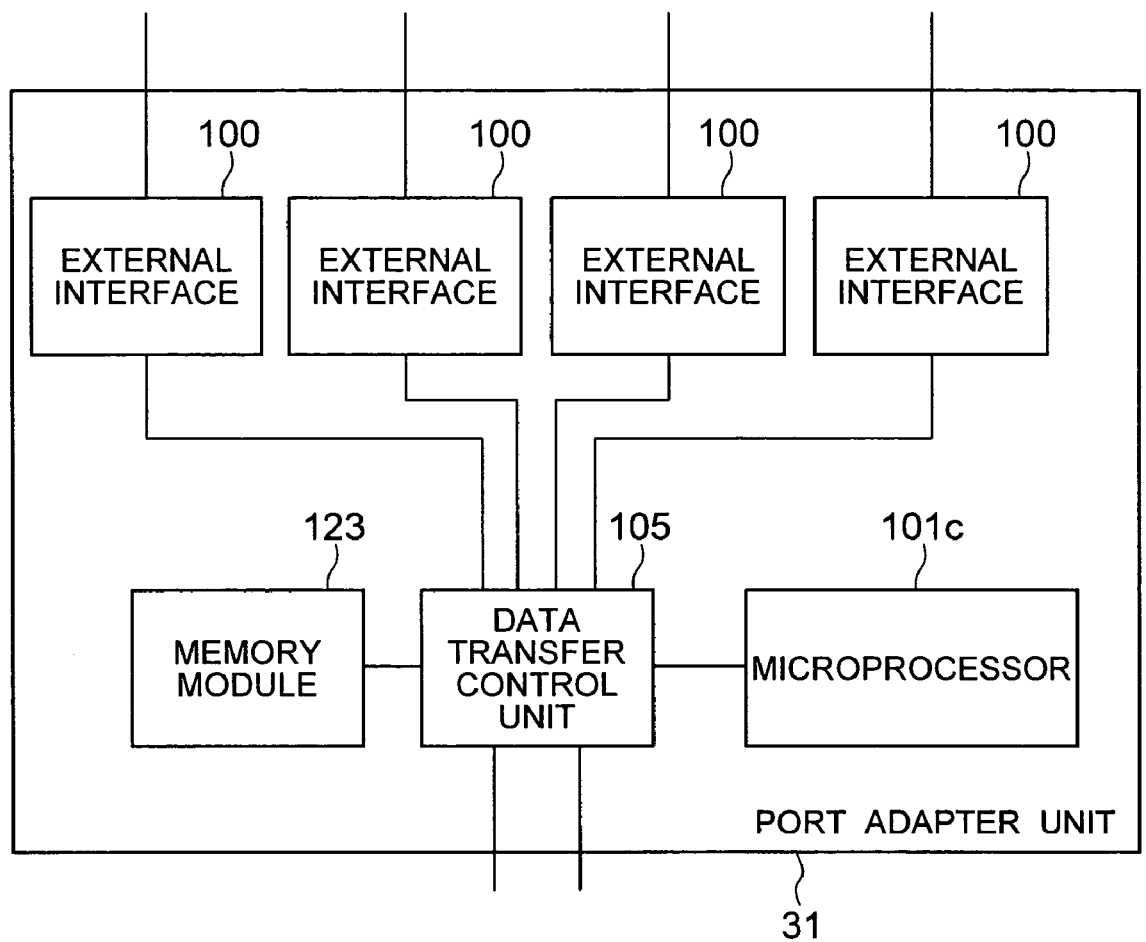
FIG. 18 is a block diagram illustrating the configuration of a port adaptor unit in the third embodiment of the present invention.

FIG. 18 is a block diagram illustrating the configuration of the port adapter unit 31 in the third embodiment. As illustrated, the port adapter unit 31 has a microprocessor 101c added to the interface unit 10 in the first embodiment. The microprocessor 101c is connected to a data transfer control unit 105. The microprocessor 101c is provided for forwarding commands. The microprocessor 101c is not involved in the data input/output process performed between the storage system 1c and the server 3. Therefore, the microprocessor 101c may be inferior in processing capabilities to the microprocessor 101 in the first embodiment. In this way, the microprocessor 101c is used to forward commands in the third embodiment. Advantageously, in the third embodiment, commands can be forwarded to the storage adapter unit 71 assigned to process commands in units of volumes.

Next, the storage adapter unit 71 in the third embodiment will be described in terms of the configuration in detail with reference to FIG. 19.

Figure 19:
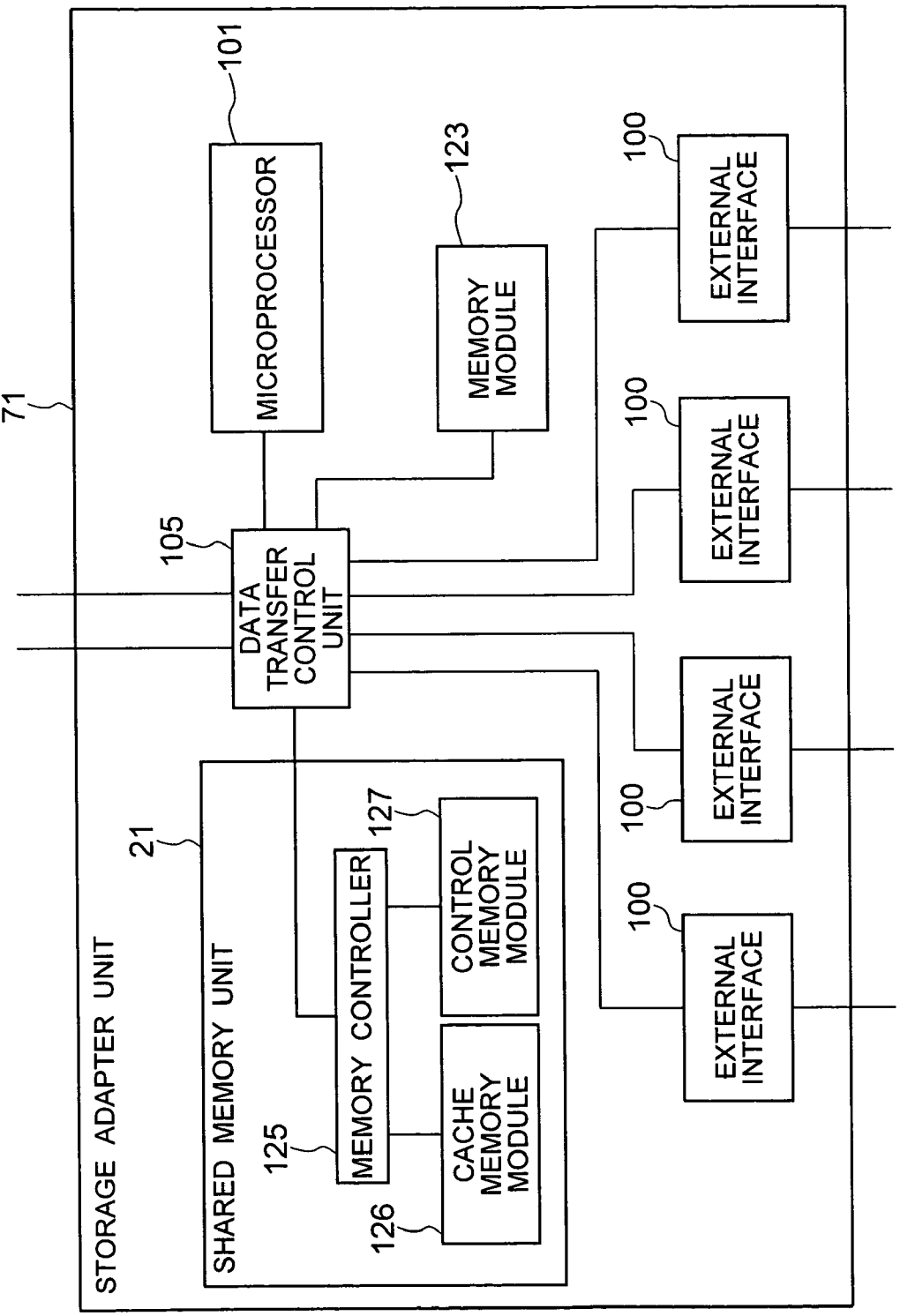
FIG. 19 is a block diagram illustrating the configuration of a storage adaptor unit in the third embodiment of the present invention.

FIG. 19 is a block diagram illustrating the configuration of the storage adapter unit 71 in the third embodiment of the present invention. As illustrated, the storage adapter unit 71 in the third embodiment comprises a shared memory unit 21, and external interfaces 100 for connection to the hard disk drives 2, in addition to the microprocessor unit 81 in the first embodiment. The shared memory unit 21 comprises a memory controller 125, a cache memory module 126, and a control memory module 127, just like the shared memory unit 21 in the first embodiment.

The memory controller 125 and external interfaces 100 are respectively connected to the data transfer control unit 105. The respective components (data transfer control unit 105, microprocessor 101, memory module 123, shared memory unit 21, and external interfaces 100) which make up the storage adapter unit 71 are identical in function to those in the first embodiment.

Next, description will be made on programs and data structures associated with the storage system 1*c* in the third embodiment.

Figure 20:
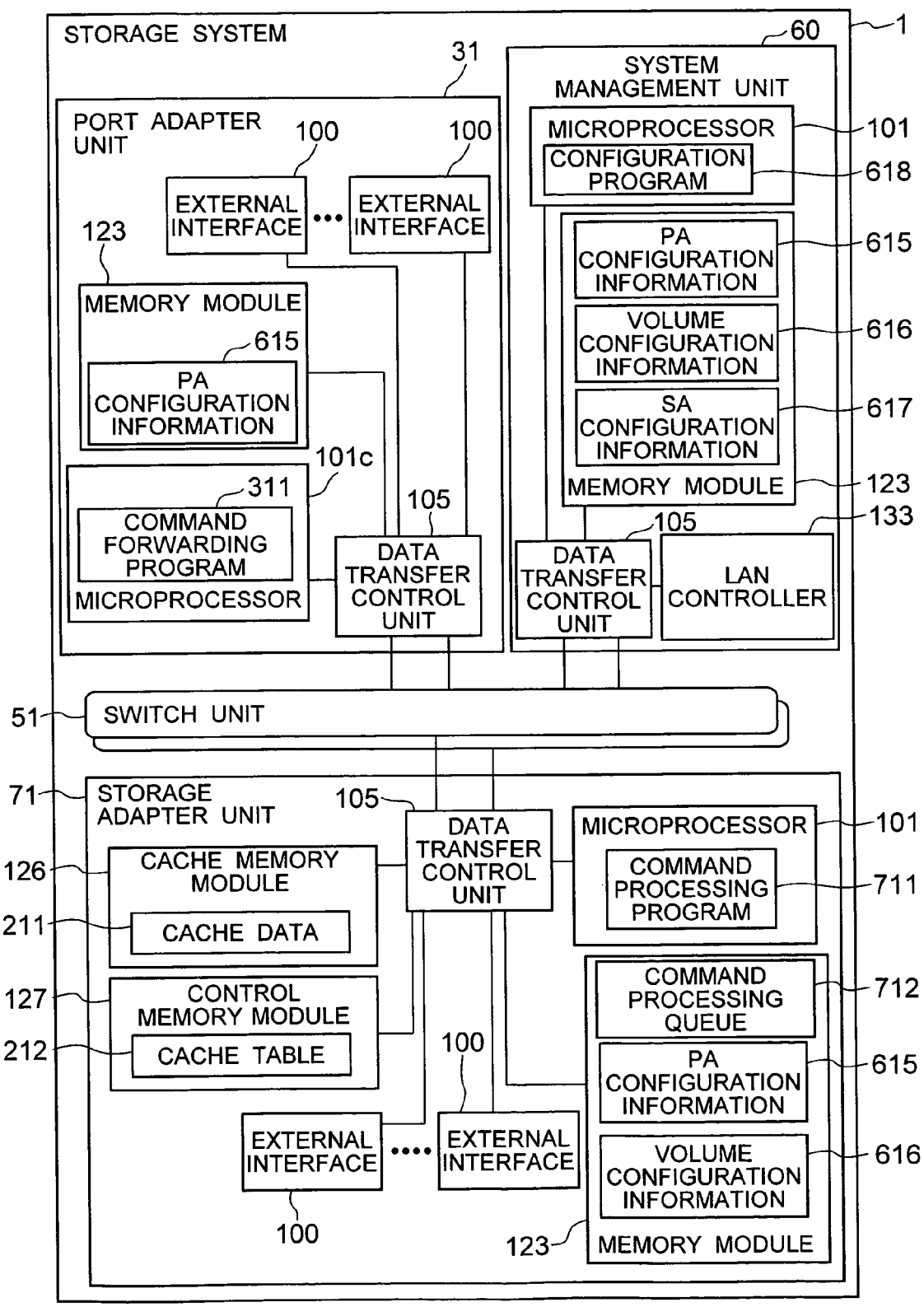
FIG. 20 is a block diagram representing the structures of various data held in a storage system, and programs executed by the storage system in the third embodiment of the present invention.

FIG. 20 is a block diagram illustrating the structures of various data held in the storage system 1*c,* and programs executed in the storage system 1*c* in the third embodiment of the present invention.

Described first is data held by the port adapter unit 31. The memory module 123 of the port adapter unit 31 stores port adapter configuration information (PA configuration information) 615. The port adapter configuration information 615 indicates the correspondence of each external interface 100 to the storage adapter unit 71 which processes commands received through the external interface 100.

Next descried is data held by the storage adapter unit 71. The cache memory module 126 of the storage adapter unit 71 has a cache data unit 211. The control memory module 127 stores a cache table 212. The illustrated cache data unit 211 and cache table 212 are identical to the cache data unit 211 and cache table 212 described in the first embodiment.

The memory module 123 of the storage adapter unit 71 stores command processing queues 712, PA configuration information 615, and volume configuration information 616. The volume configuration information 616 indicates the correspondence of volumes provided by the storage adapter unit 71 to the hard disk drives 2 connected to the storage adapter unit 71. The command processing queues 712 are provided for temporarily storing commands forwarded from the port adapter unit 31, orderly arranged on a volume-by-volume basis.

Next described is data held by the system management unit 60. The memory module 123 of the system management unit 60 stores the PA configuration information 615, volume configuration information 616, and storage adapter configuration information (SA configuration information) 617. The SA configuration information 617 is provided for managing the number of volumes processed by each storage adapter unit 71. The PA configuration information 615, volume configuration information 616, and SA configuration information 617 will be described later in greater detail.

Next, description will be made on programs executed in the storage system 1*c* in the third embodiment.

The microprocessor 101*c* of the port adapter unit 31 executes a command forwarding program 311 to perform a command forwarding process, later described. The microprocessor 101 of the storage adapter unit 71 in turn executes a command processing program 711 to perform a process corresponding to a received command. The microprocessor 101 of the system management unit 60 executes a configuration program 618 to perform a configuration process, later described.

When the storage system is powered on, the microprocessor 101 of the system management unit 60 loads an initialize program from the non-volatile memory module 132 (not shown in FIG. 20) for execution. In the initialize program, the microprocessor 101 loads the foregoing respective programs (command forwarding program 311, configuration program 618, and command processing program 617), and data (PA configuration information 615, volume configuration information 616, SA configuration information 617) from the non-volatile memory module 132. Then, the microprocessor 101 copies the loaded programs and data into the memory modules 123 of the port adapter unit 31 and storage adapter unit 71. The microprocessor 101 of the system management unit 60 forces the microprocessor 101*c* of the port adapter unit 31 to start the command forwarding program 311, forces the microprocessor 101 of the storage adapter unit 71 to start the command processing program 711, and initializes the cache data unit 211 and cache table 212.

Next, description will be made on the PA configuration information 615, volume configuration information 616, and SA configuration information 617 held by the storage system 1*c* in the third embodiment.

FIGS. 21A, 21B, 21C are tables schematically showing the PA configuration information 615, volume configuration information 616, and SA configuration information 617 held in the storage system 1*c* in the third embodiment, respectively.

First described is the PA configuration information 615 shown in FIG. 21A. The PA configuration information 615 is provided for holding data indicative of the correspondence relationship between volumes provided by the port adapter unit 31 and the storage adapters 71 assigned to process the volumes, and has a plurality of entries 615*a*-615*g*.

The entries 615*a*-615*g* store a "PA number 6151," a "external interface number 6152," a "LUN 6153" an "occupation flag 6154," "required performance 6155," "number for assigned SA 6156," and a "number for command processing queue 6157," respectively.

The "PA number 6151" is a number for specifying (identifying) the port adapter unit 31 in the storage system 1*c*. The "external interface number 6152" and "LUN 6153" are the same as the "external interface number 6135" and "LUN 6136" described in the first embodiment. The "PA number 6151," "external interface number 6152," and "LUN 6153" are used by the server 3 to specify a volume to be accessed.

The occupation flag 6154 indicates whether or not a volume has been previously assigned to a combination of the "PA number 6151," "external interface number 6152," and "LUN 6153." The "required performance 6155" refers to the performance required to an associated volume by the server 3, and is represented by the number of commands which can be processed per unit time.

The "number for assigned SA 6156" is a number for specifying (identifying) the storage adapter unit 71 which processes commands destined to a volume specified by the "PA number 6151," "external interface number 6152," and "LUN 6153." The "number for command processing queue 6157" is a number for specifying (identifying) a queue which registers commands destined to the volume within the command processing queues 712 held by the memory module 123 of the storage adapter unit 71.

Described next is the volume configuration information 616 shown in FIG. 21B. The volume configuration information 616 is provided for holding the correspondence relationship between volumes provided by the storage adapter unit 71 and the hard disk drives, and has a plurality of entries 616a-616d.

The entries 615a-615d store an "SA number 6161," a "number for hard disk drives 6162," an "occupation flag 6163," and a "number for command processing queue 6164," respectively.

The "SA number 6161" is a number for specifying (identifying) the storage adapter unit 71 in the storage system 1c. Then, the "SA number 6161" and "number for hard disk drives 6162" are used to specify the storage adapter unit 71 which provides a volume, and the hard disk drives 2 which store data of the volume.

The "occupation flag 6163" is a flag for indicating whether or not a volume has been previously assigned to the hard disk drives 2 specified by the "SA number 6161" and "number for hard disk drives 6162." The "number for command processing queue 6164" is a number for specifying a queue which registers commands destined to the volume within the command processing queues 712 which register commands to the "SA number 6161."

Next described is the SA configuration information 617 shown in FIG. 21C. The SA configuration information 617 has a plurality of entries 617a-617b for holding the number of volumes processed by the storage adapter 71. The entries 617a, 617b store an "SA number 6171" and a "number of assigned volumes 6172," respectively. The "number of assigned volumes 6172" is data indicative of the number of volumes provided by the storage adapter unit 71 identified by the "SA number 6171" stored in the entry 617a.

Next, operations involved in each of programs executed in the storage system 1c in the third embodiment will be described with reference to FIGS. 22 and 23.

First described is each of programs executed in the port adapter unit 31 and storage adapter unit 71 of the storage system 1c.

Figure 22:
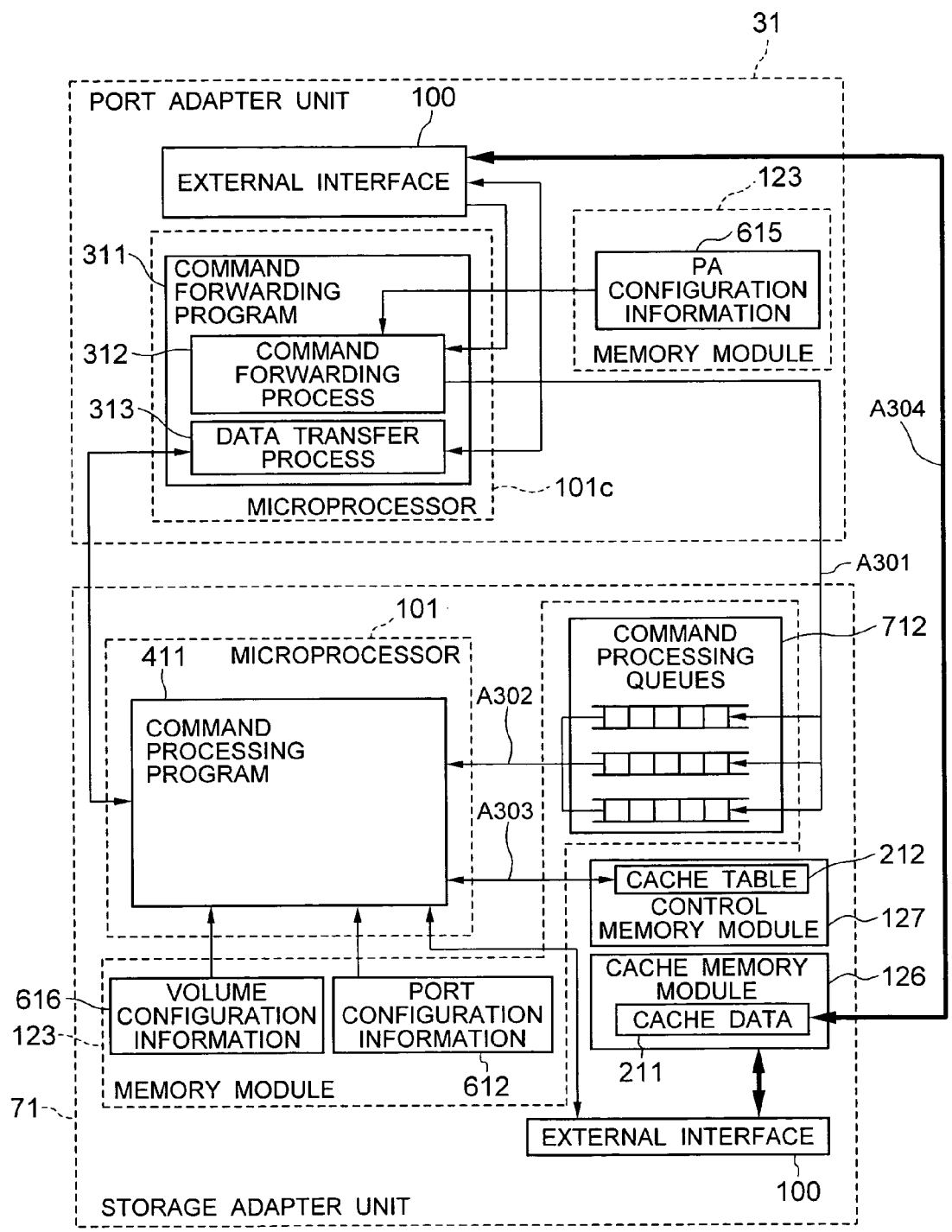
FIG. 22 is a block diagram representing operations involved in each of programs executed in the port adaptor unit and storage adaptor unit in the third embodiment of the present invention.

FIG. 22 is a block diagram representing operations involved in each of programs executed in the port adaptor unit 31 and storage adaptor unit 71 in the third embodiment of the present invention.

The port adapter unit 31 of the storage system 1c receives commands from the server 3 connected thereto through the network. Specifically, the external interface 100 included in the port adapter unit 31 receives a command transmitted from the server 3 connected to the external interface 100. Then, the external interface 100 of the port adapter unit 21 writes the received command into the memory module 123 included therein.

The microprocessor 101c of the port adapter unit 31 runs the command forwarding program 311 to perform the command forwarding process 312. Specifically, the microprocessor 101c is polling the memory modules 123 in the command forwarding process 312 of the command forwarding program 311. Upon detection of a received command, the microprocessor 101c searches the PA configuration information 615 for an entry corresponding to a volume specified by the command (volume specified by the "PA number 6151," "external interface number 6152," and "LUN 6153"). Then, the microprocessor 101c registers the received command in the command processing queue 712 in the storage adapter unit 71 specified by the "number for assigned SA 6156" and "number for command processing number 6157 in the storage adapter unit 71" in the retrieved entry (A301).

Next described is operations involved in the command processing program executed by the storage adapter unit 71.

The microprocessor 101 of the storage adapter unit 71 checks each of the command processing queues 712 in order at all times with the aid of the command processing program 411. When commands exists in a queue, the microprocessor 101 deques the commands one by one from the queue (A302), and performs processes corresponding to the commands.

The specific process executed therein is similar to that of the command processing program 812 in the first embodiment. Specifically, the microprocessor 101 determines a cache hit or miss using the commands and cache table 212 (A303). If the result of the determination indicates a cache miss, the microprocessor 101 accesses the external interface 100 to transfer data from the hard disk drive 2 to the cache date unit 211. Subsequently, the microprocessor 101 requests the port adapter unit 31 for the data transfer process 313.

The microprocessor 101c of the port adapter unit 31 accesses the external interface 100 of the port adapter unit 31 to transfer data between the cache data unit 211 and the server 3 (A304). Upon completion of the data transfer, the microprocessor 101 of the storage adapter unit 71 completes the command process, and again continues to check the command processing queues 712.

In the storage system 1c in the third embodiment, a maximum number of commands which can be processed by the microprocessor 101 of the storage adapter unit 71 per unit time basically depends on the performance of the microprocessor 101. It can therefore be deemed that the number of commands which can be processed per unit time when the server 3 accesses a certain volume is inversely proportional to the number of assigned volumes 6172 of the microprocessor 101 assigned to that volume.

Next described is the configuration program 618 executed by the system management unit 60 of the storage system 1c.

Figure 23:
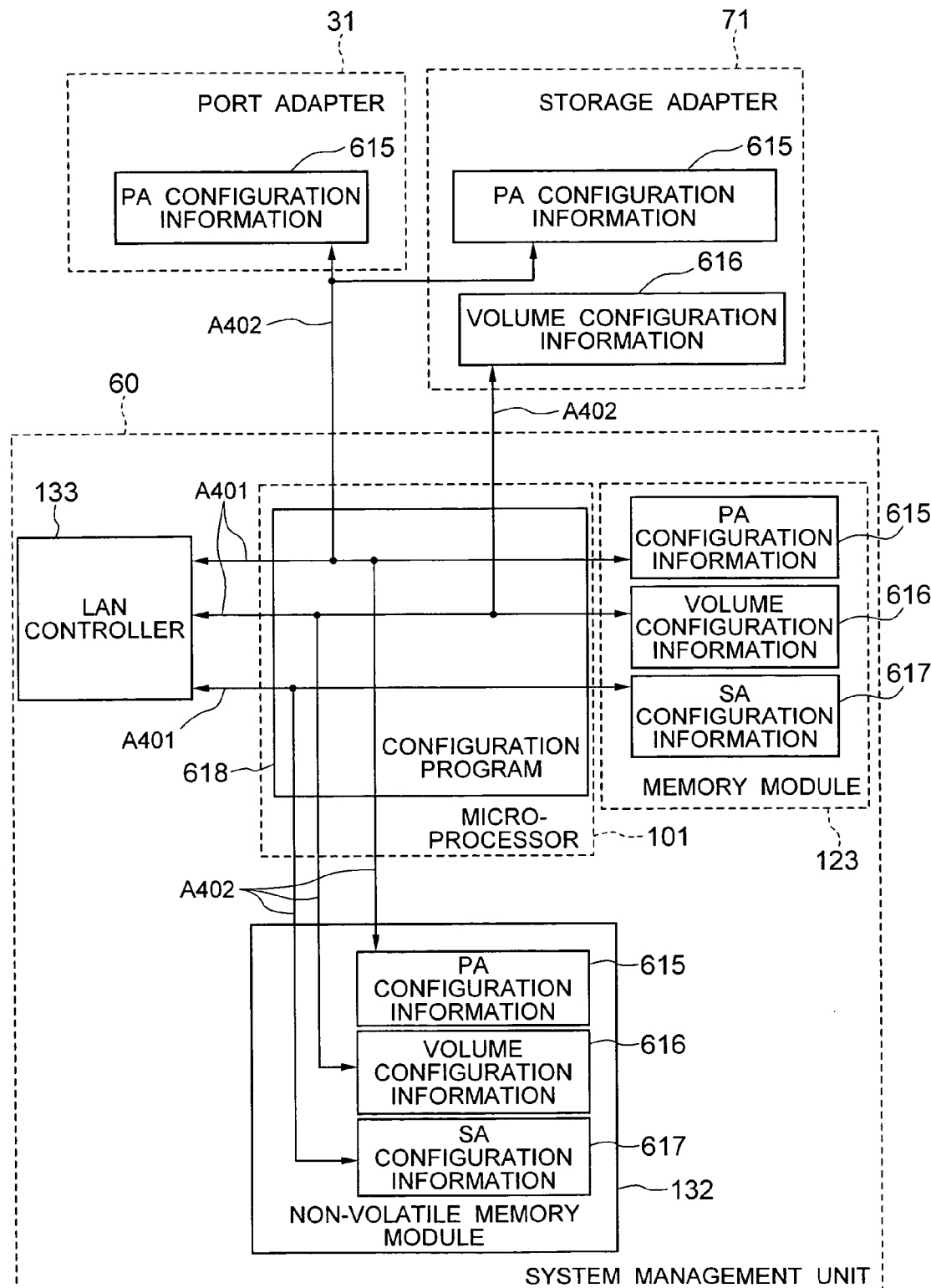
FIG. 23 is a block diagram representing operations involved in a configuration program executed by a system management unit in the third embodiment of the present invention.

FIG. 23 is a block diagram representing operations involved in the configuration program 718 executed by the system management unit 60 of the storage system 1c.

The microprocessor 101 of the system management unit 60 starts the configuration program 618 when the LAN controller 133 accepts an access from the storage management console 4. With the aid of the configuration program 618, the microprocessor 101 transmits the PA configuration information 615, volume configuration information 616, and SA configuration information 617 stored in the memory module 123 of the system management unit 60 to the storage management console 4 in response to a request received from the storage management console 4 through the LAN controller 133 (A401).

The processor 101 also modifies the foregoing information (PA configuration information 615, volume configuration information 616, and SA configuration information 617) in response to a request from the storage management console 4 with the aid of the configuration program 618. When the microprocessor 101 modifies the PA configuration information 615, volume configuration information 616, and SA configuration information 617, the microprocessor 101 makes the same modifications to the PA configuration information 615 and volume configuration information 616 stored in the non-volatile memory module 132 and the memory modules 123 of all the port adapter units 31 and storage adapter units 71 in the storage system 1c (A402).

Figure 24:
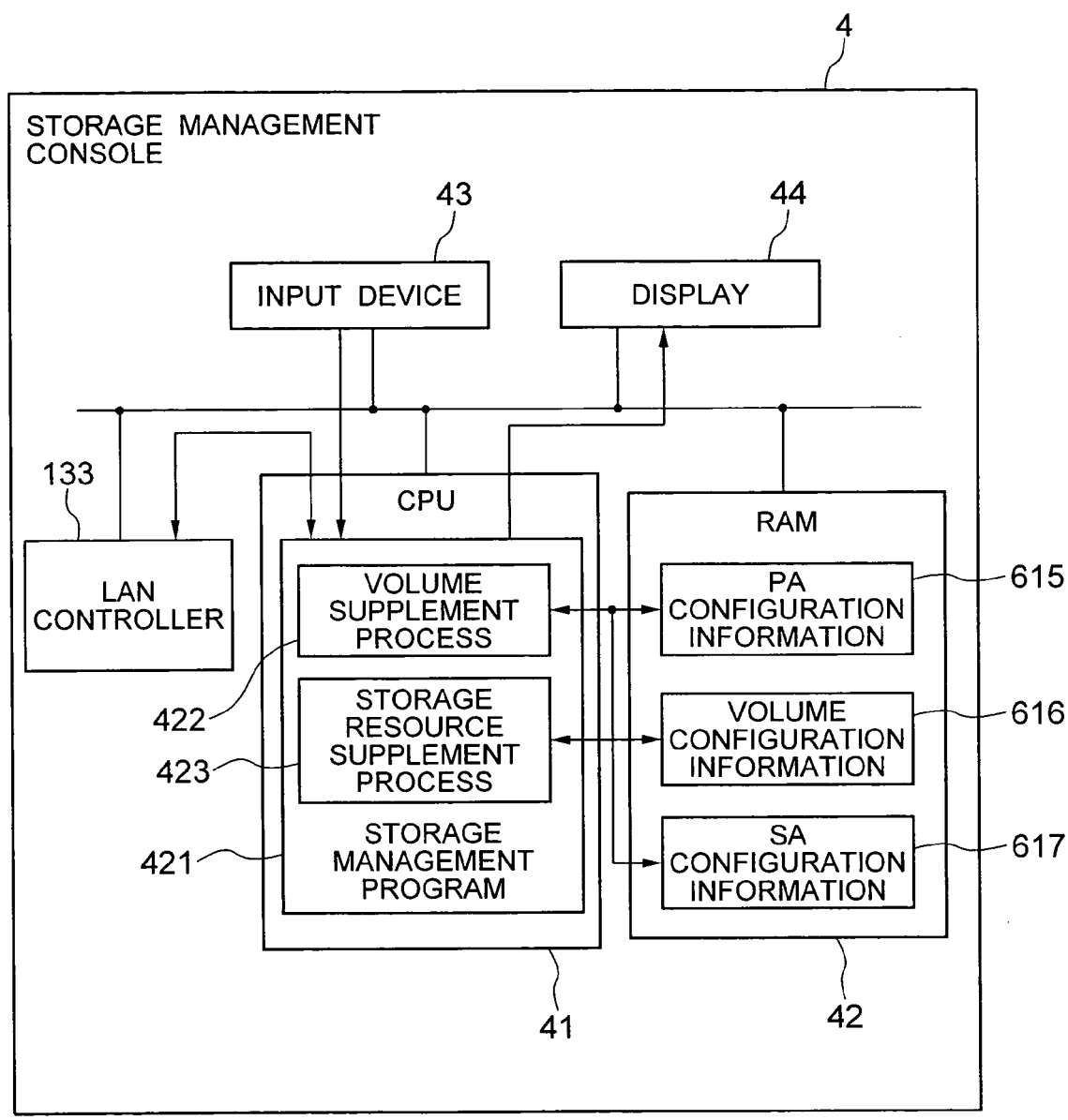
FIG. 24 is a block diagram illustrating the configuration of a storage management console in the third embodiment of the present invention.

Next described is the configuration of the storage management console 4 in the third embodiment, and the structure of data handled by the storage management console 4 with reference to FIG. 24.

FIG. 24 is a block diagram illustrating the configuration of the storage management console 4 in the third embodiment of the present invention.

While the storage management console 4 in the third embodiment is similar in configuration to the storage management console 4 in the first embodiment, they differ in programs executed thereby and the structure of data handled thereby.

The CPU 41 runs a storage management program 421 to make a variety of requests to the storage system 1c. The CPU 41 also acquires the PA configuration information 615, volume configuration information 616, and SA configuration information 617 from the storage system 1c, and stores the acquired information in the RAM 42 with the aid of the storage management program 421.

The storage management program 421 causes the storage management console 4 to execute a volume supplement process 422 and a storage resource supplement process 423, later described.

The volume supplement process 422 sets the correspondence between the storage adapter unit 71 and the combination of the external interface 100 of the port adapter unit 31 and the LUN, and the correspondence between the hard disk drives 2 and the combination of the external interface 100 of the port adapter unit 31 and the LUN, such that the server 3 is allowed to use new volumes. The storage resource supplement process 423 in turn is started by the administrator after the port adapter unit 31, storage adapter unit 71, and hard disk drives 2 have been added to the storage system 1c.

Next, detailed description will be made on the flow of the volume supplement process 422 executed by the storage management console 4 in the third embodiment.

Figure 25:
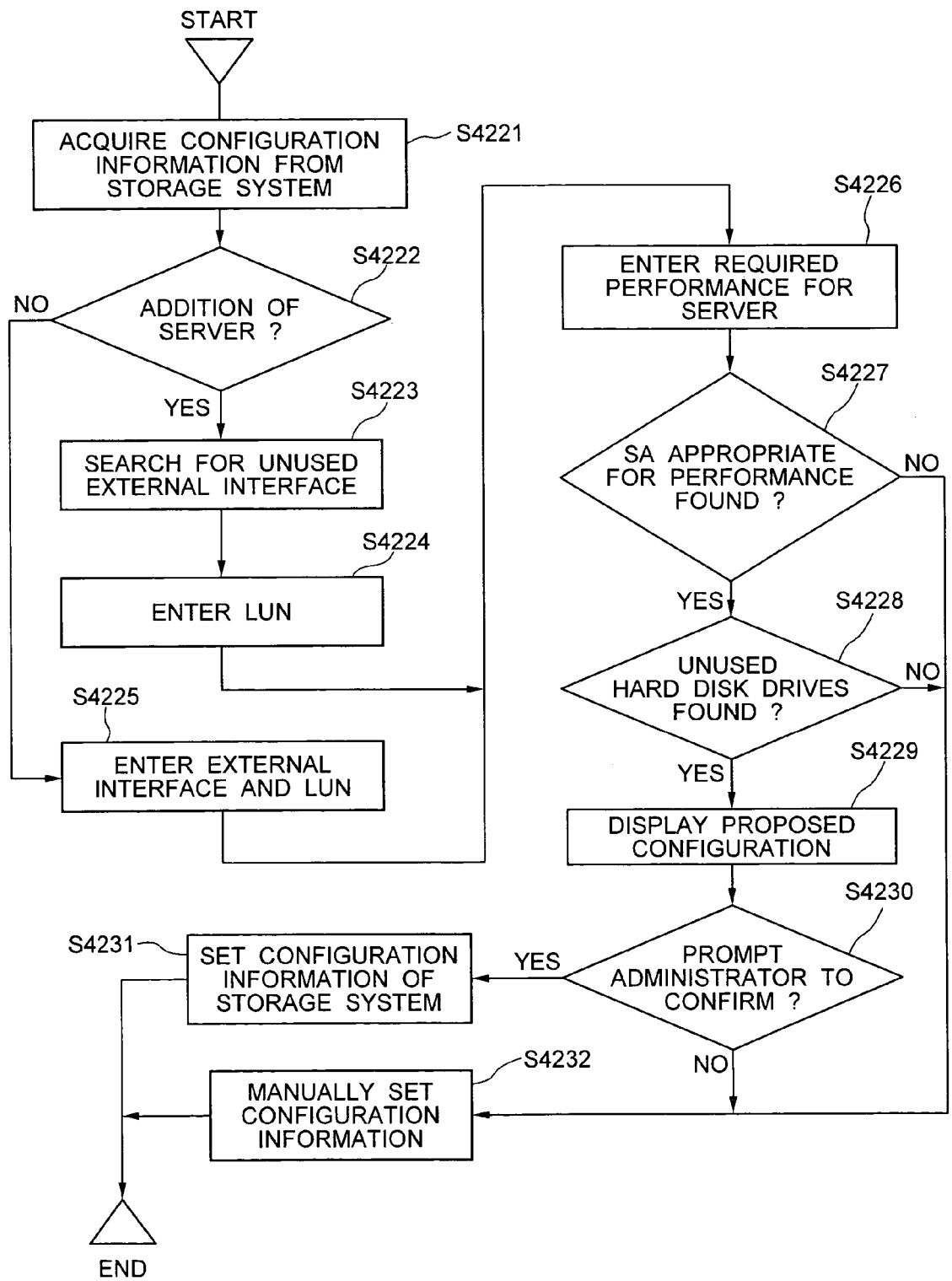
FIG. 25 is a flow chart illustrating a processing flow of a volume supplement process executed by the storage management console in the third embodiment of the present invention.

FIG. 25 is a flow chart illustrating the flow of the volume supplement process 422 executed by the storage management console 4 in the third embodiment of the present invention.

Upon receipt of a manipulation from the administrator, the CPU 41 runs the storage management program 421 to start the volume supplement process 422. The CPU 41 first communicates with the system management unit 60 of the storage system 1c through the LAN controller 133 to acquire the PA configuration information 615, volume configuration information 616, and SA configuration information 617, and stores the acquired information in the PAM 42 with the aid of the storage management program 421 (step 4221).

Next, the CPU 41 displays a message on the display 44 for prompting the administrator to confirm whether or not an additional server 3 should be newly connected to the storage system 1c with the aid of the storage management program 421, and waits for the administrator to enter a reply. Then, the CPU 41 proceeds to step 4223 if it receives data from the administrator indicating that an additional server 3 should be newly connected to the storage system 1c. On the other hand, the CPU 41 proceeds to step 4224 if it receives data from the administrator indicating that an additional server 3 should not be newly connected to the storage system 1c (step 4222).

At step 4233, the CPU 41 selects an unused external interface 100 from the storage system 1c. Specifically, the CPU 41 searches the PA configuration information 615 stored in the RAM 42 for an external interface 100 to which any volume has not been assigned (step 4223).

Next, the CPU 41 displays a message on the display 44 for requesting the administrator to enter the LUN of a volume to be added, receives the LUN entered by the administrator (step 4224), and proceeds to the processing at step 4226.

Now, description will be made on the processing at step 4225 to which the CPU 41 proceeds when the administrator enters the data indicating that an additional server 3 should not be newly connected to the storage system 1c into the storage management console 4 at step 4222.

At step 4225, a volume is added to the server 3 which has been previously connected to the storage system 1c. The CPU 41 displays a message on the display 44 for requesting the administrator to enter data indicative of a combination of an "external interface" and "LUN" for specifying a volume to be added. The CPU 41 proceeds to step 4226 after it receives the data indicative of a combination of an "external interface" and "LUN" entered by the administrator.

At step 4226, the CPU 41 displays a message on the display 44 for requesting the administrator to enter required performance for the volume to be added, and waits for the administrator to enter a reply. Assume herein that the required performance is represented by the number of commands which can be processed per unit time.

Upon receipt of the required performance entered by the administrator, the CPU 41 searches the storage system 1c for all storage adapter units 71 which meet the required performance. Specifically, the CPU 41 estimates calculated performance of each storage adapter unit 71 when it is additionally assigned to the processing of the volume, using the number of assigned volumes 6172 in the entry 617b of the SA configuration information 617 corresponding to each storage adapter unit 71. In the third embodiment, the calculated performance is estimated by dividing the "performance of the microprocessor 101 in the storage adapter unit 71" by the "number of assigned volumes 6172 in the entry 617b of the SA configuration information 617 stored in the RAM 42 plus one." In this embodiment, the "performance of the microprocessor" is assumed to be found by such a method as a measurement using prior art techniques.

Then, the CPU 41 determines through a comparison of the calculated performance with the PA configuration information 615 whether or not the calculated performance meets the required performance entered at step 4226, and whether or not the calculated performance meets the required performance of each volume, the processing of which has been previously assigned to the appropriate storage adapter unit 71 (step 4227).

If the CPU 41 can find storage adapter units 71 which meet the required performance at step 4227, the CPU 41 searches the volume configuration information 616 for unused disk drives 2 which belong to each of the selected storage adapter units 71 (step 4228).

If unused hard disk drives 2 are found at step 4228, the CPU 41 displays a combination of the found hard disk drives 2 and storage adapter unit 71 to which the hard disk drives 2 belong. The CPU 41 also displays a message for requesting the administrator to confirm whether or not the administrator permits the configuration with the displayed combination, and waits for the administrator to enter a reply (steps 4229, 4230).

Upon receipt of data entered by the administrator indicating that the configuration is permitted with the displayed combination at step 4230, the CPU 41 updates the PA configuration information 615, volume configuration information 616, and SA configuration information 617 stored in the storage system 1c through the LAN controller 133 (step 4231).

Specifically, the CPU 41 requests the system management unit 60 of the storage system 1 to update the PA configuration information 615, volume configuration information 616, and SA configuration information 617 through the LAN controller 133 with the aid of the storage management program 421. The system management unit 60, upon receipt of the update request, updates the PA configuration information 615, volume configuration information 616, and SA configuration information 617 stored in each memory module 123 in the storage system 1c with the aid of the configuration program 618.

Consequently, the PA configuration information 615, volume configuration information 616, and SA configuration information 617 are updated in the following manner. Specifically, the "occupation flag 6154" indicative of "used" is stored in the entry 615d of the PA configuration information 615 corresponding to the "external interface 100" and "LUN" received at steps 4223 and 4224 or 4225. Also, the "required performance 6155" received at step 4266 is stored in the entry 615e corresponding to the foregoing. The number (identification number) for the storage adapter unit 71 displayed on the display 44 in the processing at step 4229 is entered in the entry 616f corresponding to the foregoing as the "number for assigned SA 6156." The "number for command processing queue 6157" for specifying a queue 712 for registering commands for a volume specified by the received "external interface 100" and "LUN" is stored in the entry 615g corresponding to the foregoing.

Also, the "occupation flag 6163" indicative of "used" is stored in the entry 616c of the volume configuration information 616 corresponding to the hard disk drives 2 selected at step 4228. Also, the value equal to the number of assigned volumes 6172 of the storage adapter 71 plus "1" is stored in the entry 617b of the SA configuration information 617 corresponding to the storage adapter 71 displayed on the display 44 at step 4229.

Next, description will be made on the processing at step 4232 to which the CPU 41 proceeds when it cannot find any storage adapter unit 71 which meets the required performance at step 4227, or when it cannot find unused hard disk drives 2 at step 4228, or when the administrator rejects the configuration with the displayed combination at step 4230.

At step 4232, the CPU 41 outputs a message for requesting the administrator to make a manual setting to the display 44. Upon receipt of updated data manually entered by the administrator for the PA configuration information 615, volume configuration information 616, and SA configuration information 617, the CPU 41 requests the system management unit 60 of the storage system 1c to update the PA configuration information 615, volume configuration information 616, and SA configuration information 617. Upon receipt of the update request, the system management unit 60 updates the PA configuration information 615, volume configuration information 616, and SA configuration information 617 stored in each memory module 123 in the storage system 1c with the aid of the configuration program 618.

Next, detailed description will be made on the storage resource supplement process 423 executed by the storage management console 4 in the third embodiment.

Figure 26:
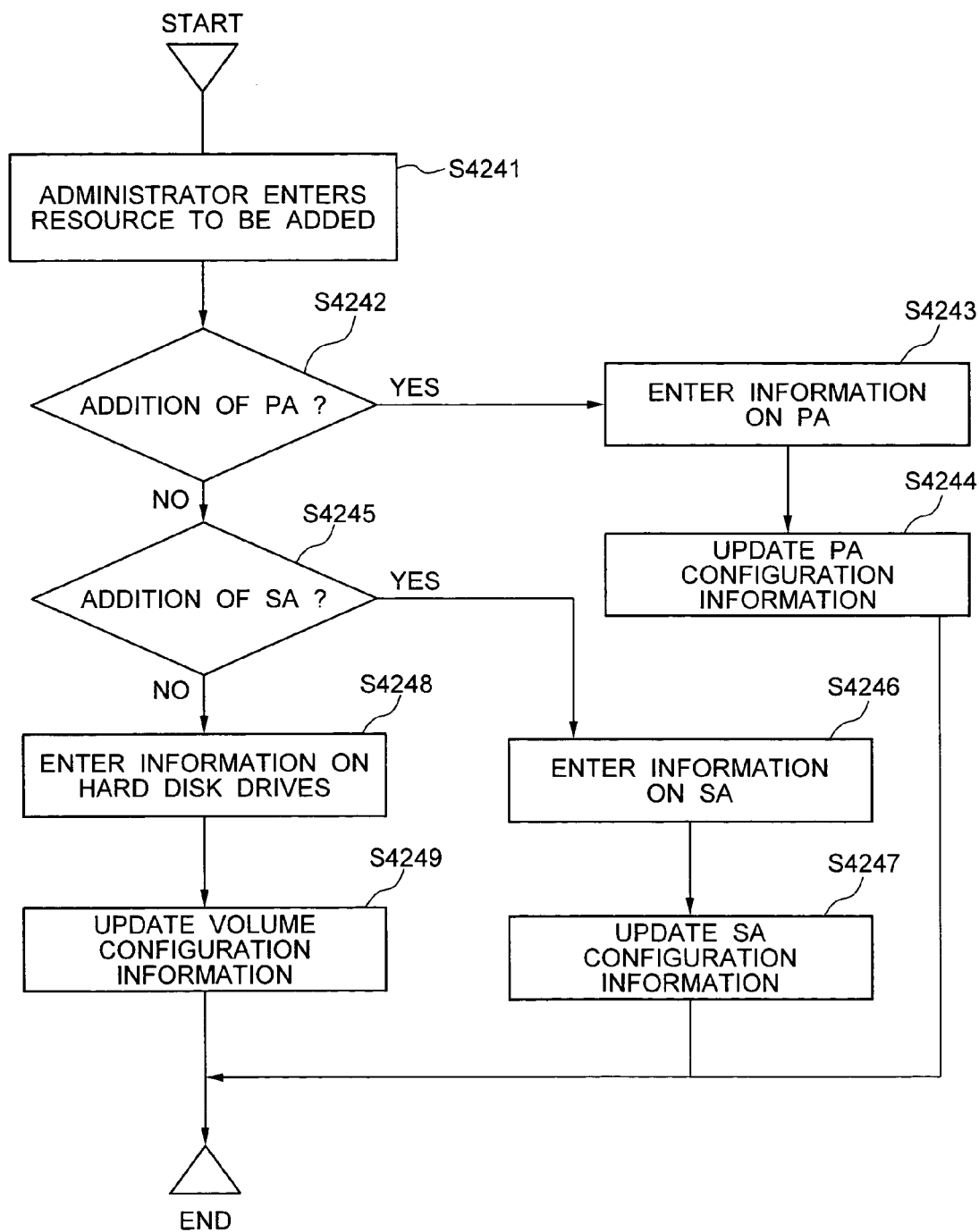
FIG. 26 is a flow chart illustrating a processing flow of a storage resource supplement process executed by the storage management console 4 in the third embodiment of the present invention.

FIG. 26 is a flow chart illustrating the flow of a storage resource supplement process 423 executed by the storage management console 4 in the third embodiment of the present invention.

Upon receipt of a manipulation from the administrator, the CPU 41 runs the storage management program 421 to start the storage resource supplement process 423. The CPU 41 displays a setting display on the display 44 for receiving a resource to be added, and requests the administrator to enter the type of resource to be added. Then, the CPU 41 proceeds to step 4242 upon receipt of the type of resource to be added, entered by the administrator (step 4241).

At step 4242, the CPU 41 determines whether or not the entered data received at step 4241 indicates "addition of port adapter unit 31." The CPU 41 proceeds to the processing at step 4243 when it determines that the entered data indicates the "addition of port adapter unit 31." Conversely, the CPU 41 proceeds to step 4245 when it determines that the entered data does not indicate the "addition of port adapter unit 31."

At step 4243, the CPU 41 displays a message on the display 44 for requesting the administrator to enter the PA number 6151 for a port adapter 31 to be added, and waits for the administrator to enter a reply.

Upon receipt of a reply entered by the administrator, the CPU 41 communicates with the system management unit 60 of the storage system 1c through the LAN controller 133 to update the PA configuration information 615 held in the storage system 1c (step 4244).

Specifically, a set of entries (the number of entries equal to the product of the "number of external interfaces 100 included in the port adapter unit 31 to be added" and a "maximum value of LUN which can be set") is added to the PA configuration information 615. Then, in the added set of entries, the "PA number 6151" entered by the administrator is set in an entry 615a; the "external interface number 6152" entered by the administrator is set in an entry 615b; a predetermined serial number (for example, "0, 1, 2, 3, . . . , n) is set in an entry 615c; and an occupation flag 6154 indicative of "unused" is set in an entry 615d. upon completion of the settings for the PA configuration information 615 held in the storage system 1c, the CPU 41 terminates the storage resource supplement process 423.

Next, description will be made on the processing at step 4245 to which the CPU proceeds when it determines at step 4242 that the received data entered by the administrator is not the "addition of port adapter unit 31."

At step 4245, the CPU 41 determines whether or not the entered data received at step 4241 indicates "addition of storage adapter unit 71." The CPU 41 proceeds to step 4246 when it determines the "addition of storage adapter unit 71." On the other hand, the CPU 41 proceeds to step 4248 when it does not determine the "addition of storage adapter unit 71."

At step 4246, the CPU 41 displays a message on the display 44 for requesting the administrator to enter the "SA number 6171" for a storage adapter unit 71 to be added, and waits for the administrator to enter a reply.

Upon receipt of the "SA number 6171" entered by the administrator, the CPU 41 communicates with the system management unit 60 of the storage system 1c through the LAN controller 133 to update the PA configuration information 615 held in the storage system 1c (step 4247). Specifically, one set of entries is added to the SA configuration information 617, wherein the "SA number 6171" entered by the administrator is set in an added entry 617a; and "0" is set in an added entry 617b as "the number of assigned volumes 6172". Upon completion of the settings for the SA configuration information 617, the CPU 41 terminates the storage resource supplement process 423.

Next, description will be made on the processing at step 4248 to which the CPU 41 proceeds when it determines that the entered data received at step 4241 is not the "addition of storage adapter unit 71."

At step 4248, the CPU 41 determines that the entered data received at step 4241 indicates "addition of hard disk drives 2." The CPU 41 displays a message on the display 44 for requesting the administrator to enter the "SA number 6161" and "number for hard disk drives 6162" of the storage adapter unit 71 to which hard disk drives 2 to be added are connected, and waits for the administrator to enter these numbers.

Upon receipt of the "SA number 6161" and "number for hard disk drives 6162" entered by the administrator, the CPU 41 communicates the system management unit 60 of the storage system 1c through the LAN controller 133 to update the volume configuration information 616 (step 4249). Specifically, one set of entries is added to the volume configuration information 616, wherein the "SA number 6161" and "number for hard disk drives 6162" entered by the administrator are set in entries 616a, 616b, respectively. Also, the "occupation flag 6163" indicative of "unused" is set in the corresponding entry 616c. Upon completion of the settings for the volume configuration information 616, the CPU 41 terminates the storage resource supplement process 423.

As described above, according to the computer system of the third embodiment, the storage adapter unit 71 for processing commands can be set for each volume provided to the server 3. Thus, when the server 3 is provided with a plurality of volumes, different required performance can be set to each volume. Consequently, the storage system provided by the third embodiment can efficiently utilize the performance of the microprocessor 101.

It should be understood that the present invention is not limited to the embodiments described above, but a variety of modifications can be made thereto without departing from the spirit and scope of the invention. For example, in the storage system 1 in the first embodiment, the interface unit 10 may be modified to the configuration of the port adapter unit 31 in the third embodiment.

Also, the functions of the storage management console 4 in the foregoing embodiments may be performed by the storage system 1. For example, the storage management program may be installed in the system management unit 60, such that the microprocessor 101 is caused to execute the storage management program to perform the external interface configuration process, volume supplement process, and storage resource supplement process.

The invention claimed is:

1. A storage system connected to a computer through a network for receiving a variety of commands from said computer to perform a data input/output process with said computer, said storage system comprising:
   a plurality of first interfaces for receiving a variety of commands from said computer;
   a storage device for storing data;
   a second interface for communicating data with said storage device;
   a plurality of processors, each for performing a data input/output process via one of said plurality of first interfaces previously assigned thereto, in response to a received command;
   a management unit responsive to a request from an administrator for establishing a variety of configurations for said storage system, each said configuration including an assignment of one of said plurality of processors and the first interface assigned thereto; and
   an interconnection for connecting said first interfaces, said second interface, said processors, and said management unit to one another,
   wherein, in response to said request from said administrator, said management unit configures said storage system for data input/output via one of said plurality of first interfaces and one of said plurality of processors, by selecting an unassigned first interface from among said plurality of first interfaces for use in the data input/output process between said computer and said storage device, and selecting and assigning to the selected first interface a processor from among said plurality of processors which meets required performance of said computer entered by said administrator, for use in said data input/output process.

2. A computer system having a storage system connected to a computer through a first network for receiving a variety of commands from said computer to perform a data input/output process with said computer, and a management console connected to said storage system through a second network for establishing a variety of configurations for said storage system, wherein:
   said storage system comprises:
   a plurality of first interfaces for receiving a variety of commands from said computer;
   a storage device for storing data;
   a second interface for communicating data with said storage device;
   a plurality of processors each for processing a received command via one of said plurality of first interfaces previously assigned thereto;
   a management unit responsive to a request from an administrator for establishing a variety of configurations for said storage system, each said configuration including an assignment of one of said plurality of processors and the first interface assigned thereto, said management unit storing configuration information of said storage system, including said assignments; and
   an interconnection for connecting said first interfaces, said second interface, said processors, and said management unit to one another, and said management console comprises:
   a unit for acquiring said configuration information of said storage system from said management unit;
   a input unit for receiving required performance, entered by said administrator, for a computer connected to said storage system;
   a selector unit for selecting an unassigned first interface from among said plurality of first interfaces for use in the data input/output process between said computer and said storage device, and for selecting and assigning to the selected first interface a processor which meets the required performance for said computer from among said plurality of processors for use in said data input/output process, using said acquired configuration information and received required performance; and
   a display unit for notifying an administrator of a combination of said selected first interface and processor assigned thereto.

3. A computer system according to claim 2, wherein:
   said management console controls said management unit of said storage system to configure said storage system with said notified combination.

4. A computer system according to claim 2, wherein:
   said selector unit assigns said selected processor to said selected first interface in said combination, estimates calculated performance for said processor when said processor is assigned to said selected first interface in said combination, and selects a processor which meets said required performance using said calculated performance.

5. A storage system comprises:
a plurality of clusters each having a plurality of first interfaces each connected to a computer for receiving a variety of commands from said computer, a storage device for storing data, a second interface for communicating data with said storage device, a plurality of processors each for processing a received command via one of said plurality of first interfaces previously assigned thereto, and an interconnection for connecting said first interfaces, said second interface, and said processors to one another; and
a management unit connected to said interconnection for establishing a variety of configurations for said storage system responsive to a request from an administrator, each said configuration including an assignment of one of said plurality of processors and the first interface assigned thereto,
wherein said management unit selects an unassigned first interface from among said plurality of first interfaces of one of said clusters, for use in a data input/output process between said computer and said storage device of said one of said clusters; selects and assigns to the selected first interface a processor which meets required performance of said computer from among said plurality of processors of said one of said clusters, for use in said data input/output process; and configures said storage system with said selected first interface and processor assigned thereto.

6. A computer system comprising:
a storage system including a plurality of clusters interconnected through an inter-cluster path, each said cluster having a plurality of first interfaces each connected to a computer through a first network for receiving a variety of commands from said computer, a storage device for storing data, a second interface for communicating data with said storage device, a plurality of processors each for processing a received command via one of said plurality of first interfaces previously assigned thereto, an interconnection for connecting said first interfaces, said second interface, said processors, and said inter-cluster path to one another, and a management unit connected to said interconnection for establishing a variety of configurations for said storage system responsive to a request from an administrator, each said configuration including an assignment of one of said plurality of processors and the first interface assigned thereto; and
a management console for making a variety of configurations for said storage system, said management console being connected to said management unit through a second network, said management console including:
a selector unit responsive to a request from an administrator for selecting a combination of a first interface from among said plurality of first interfaces of one of said clusters, a processor from among said plurality of processors of said one of said clusters and assigned to process commands received by said selected first interface, and a storage device from said one of said clusters and which accepts an access from said computer, said combination being selected from the same cluster; and
a display unit for notifying the administrator of said selected combination.

7. A computer system according to claim 6, wherein:
said management console controls said management unit of said storage system to configure said storage system with said notified combination.

8. A storage system connected to a computer through a network for receiving a variety of commands from said computer to perform a data input/output process with said computer, said storage system comprising:
a port adapter having a plurality of interfaces each for receiving a variety of commands from a computer;
a storage device for storing data;
a plurality of storage adapters each connected to said storage device and having a processor for processing a variety of commands received by said port adapter associated therewith;
a management unit for establishing a variety of configurations for said storage system, each said configuration including an assignment of one of said plurality of storage adapters and said storage device; and
an interconnection for connecting said port adapter, said storage adapters, and said management unit to one another,
wherein said management unit configures said storage system to process commands destined to a volume provided by said port adapter connected to said computer via one of said storage adapters by selecting a storage adapter having a processor which meets required performance of said computer from among said plurality of storage adapters for assignment to said storage device, and selecting a storage device for connection with said selected storage adapter.

9. A computer system having a storage system connected to a computer through a first network for receiving a variety of commands from said computer to perform a data input/output process with said computer, and a management console connected to said storage system through a second network for establishing a variety of configurations for said storage system, wherein:
said storage system comprising:
a port adapter having a plurality of interfaces each for receiving a variety of commands from a computer;
a storage device for storing data;
a plurality of storage adapters each connected to said storage device and having a processor for processing a variety of commands received by said port adapter associated therewith;
a management unit for establishing a variety of configurations for said storage system, said management unit storing configuration information of said storage system, each said configuration including an assignment of one of said plurality of storage adapters and said storage device; and
an interconnection for connecting said port adapter, said storage adapters, and said management unit to one another, and
said management console comprises:
a unit for acquiring said configuration information of said storage system from said management unit;
a input unit for receiving required performance entered for a computer connected to said storage system;
a selector unit for selecting a storage adapter having a processor which meets required performance of said computer from among said plurality of storage adapters for assignment to said storage device to process commands destined to a volume provided by said port adapter connected to said computer, and selecting a storage device for connection with said selected storage adapter; and a display unit for notifying an administrator of a combination of said selected storage adapter and storage device.

10. A method of configuring a storage system connected to a computer through a network for receiving a variety of commands from said computer to perform a data input/output process with said computer, said method performed by a management console, said storage system comprising a plurality of first interfaces each for receiving a variety of commands from a computer, a storage device for storing data, a second interface for communicating data with said storage device, a plurality of processors each for performing a data input/output process via one of said plurality of first interfaces previously assigned thereto, in response to a received command, a management unit responsive to a request from an administrator for establishing a variety of configurations for said storage system, each said configuration including an assignment of one of said plurality of processors and the first interface assigned thereto, said management unit storing configuration information of said storage system including said assignment, and an interconnection for connecting said first interfaces, said second interface, said processors, and said management unit to one another, said management console being connected to said management unit through a second network, said method comprising the steps of:

acquiring the configuration information of said storage system from said management unit;

receiving required performance entered for a computer connected to said storage system; and selecting an unassigned first interface from among said plurality of first interfaces for use in the data input/output process between said computer and said storage device, and selecting and assigning to the selected first interface a processor from among said plurality of processors which meets required performance of said computer entered by said administrator, for use in said data input/output process using said acquired configuration information and said received required performance.

11. A method of configuring a storage system according to claim 10, wherein:

said step of selecting includes estimating calculated performance of said processor when said processor is assigned to said selected first interface, and selecting a processor which meets said required performance using said calculated performance.

* * * * *